(12) United States Patent
Rawdon et al.

(10) Patent No.: US 9,415,856 B2
(45) Date of Patent: Aug. 16, 2016

(54) DUAL-RIB MORPHING LEADING EDGE

(71) Applicant: The Boeing Company, Chicago, IL (US)

(72) Inventors: Blaine K. Rawdon, San Pedro, CA (US); Benjamin A. Harber, Irvine, CA (US); Neal A. Harrison, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 14/295,713

(22) Filed: Jun. 4, 2014

(65) Prior Publication Data

US 2016/0185443 A1 Jun. 30, 2016

(51) Int. Cl.
*B64C 21/10* (2006.01)
*B64C 3/48* (2006.01)
*B64C 3/44* (2006.01)

(52) U.S. Cl.
CPC ............. *B64C 3/48* (2013.01); *B64C 2003/445* (2013.01)

(58) Field of Classification Search
USPC .......................... 244/200, 214, 219, 218, 201
See application file for complete search history.

(56) References Cited

U.S. PATENT DOCUMENTS

| | | | |
|---|---|---|---|
| 2,749,060 A | 6/1956 | Brady | |
| 2,763,448 A | 9/1956 | Davie | |
| 3,244,384 A | 4/1966 | Bracka | |
| 3,556,439 A | 1/1971 | Baumgaertner | |
| 3,698,668 A | 10/1972 | Cole | |
| 3,836,099 A | 9/1974 | O'Neill et al. | |
| 3,941,334 A | 3/1976 | Cole | |
| 3,994,451 A | 11/1976 | Cole | |
| 3,994,452 A | 11/1976 | Cole | |
| 4,040,579 A | 8/1977 | McKinney | |
| 4,113,210 A | 9/1978 | Pierce | |
| 4,159,089 A | 6/1979 | Cole | |
| 4,171,787 A | 10/1979 | Zapel | |
| 4,200,253 A | 4/1980 | Rowarth | |
| 4,252,287 A * | 2/1981 | Zimmer | B64C 3/48 244/214 |
| 4,262,868 A | 4/1981 | Dean | |
| 4,349,169 A * | 9/1982 | McAnally | B64C 3/48 244/213 |
| 4,351,502 A | 9/1982 | Statkus | |
| 4,360,176 A | 11/1982 | Brown | |
| 4,427,168 A | 1/1984 | McKinney | |
| 4,429,844 A | 2/1984 | Brown et al. | |
| 4,468,014 A | 8/1984 | Strong | |
| 4,553,722 A * | 11/1985 | Cole | B64C 3/48 244/214 |
| 4,585,192 A | 4/1986 | Clifford-Jones | |
| 4,650,140 A | 3/1987 | Cole | |
| 4,706,913 A * | 11/1987 | Cole | B64C 3/48 244/214 |
| 5,158,252 A | 10/1992 | Sakurai | |

(Continued)

OTHER PUBLICATIONS

U.S. Appl. No. 14/196,461, filed Mar. 4, 2014.

(Continued)

*Primary Examiner* — Christopher P Ellis

(57) ABSTRACT

A mechanism for changing a shape of a leading edge of an airfoil may include a first rib and a second rib. The first rib may include a plurality of first rib segments. The first rib may move between a first folded shape and a first extended shape. The second rib may include a plurality of second rib segments. The second rib may move between a second folded shape and a second extended shape. An actuator may be coupled to the first rib, the second rib, or both, to move the first rib, the second rib, or both, between their respective folded and extended shapes.

18 Claims, 16 Drawing Sheets

(56) References Cited

U.S. PATENT DOCUMENTS

| | | | |
|---|---|---|---|
| 5,879,767 A | 3/1999 | Matsushima | |
| 6,076,776 A | 6/2000 | Breitbach et al. | |
| 6,375,126 B1 | 4/2002 | Sakurai | |
| 6,419,187 B1 * | 7/2002 | Buter | B64C 3/44 244/34 R |
| 6,796,534 B2 * | 9/2004 | Beyer | B64C 3/48 244/214 |
| 7,114,879 B2 | 10/2006 | Obermeyer | |
| 7,716,958 B2 | 5/2010 | Martin | |
| 7,798,443 B2 | 9/2010 | Hamilton et al. | |
| 8,042,772 B2 | 10/2011 | Lutke | |
| 8,186,630 B2 * | 5/2012 | Jaggard | B64C 3/50 244/213 |
| 8,256,719 B2 * | 9/2012 | Wood | B64C 3/48 244/200 |
| 8,342,447 B2 | 1/2013 | Etling | |
| 8,925,870 B1 * | 1/2015 | Gordon | B64C 3/28 244/200 |
| 2010/0133387 A1 | 6/2010 | Wood et al. | |
| 2016/0009372 A1 * | 1/2016 | Grip | B64C 3/28 244/214 |

OTHER PUBLICATIONS

U.S. Appl. No. 13/417,201, filed Mar. 9, 2012.

* cited by examiner

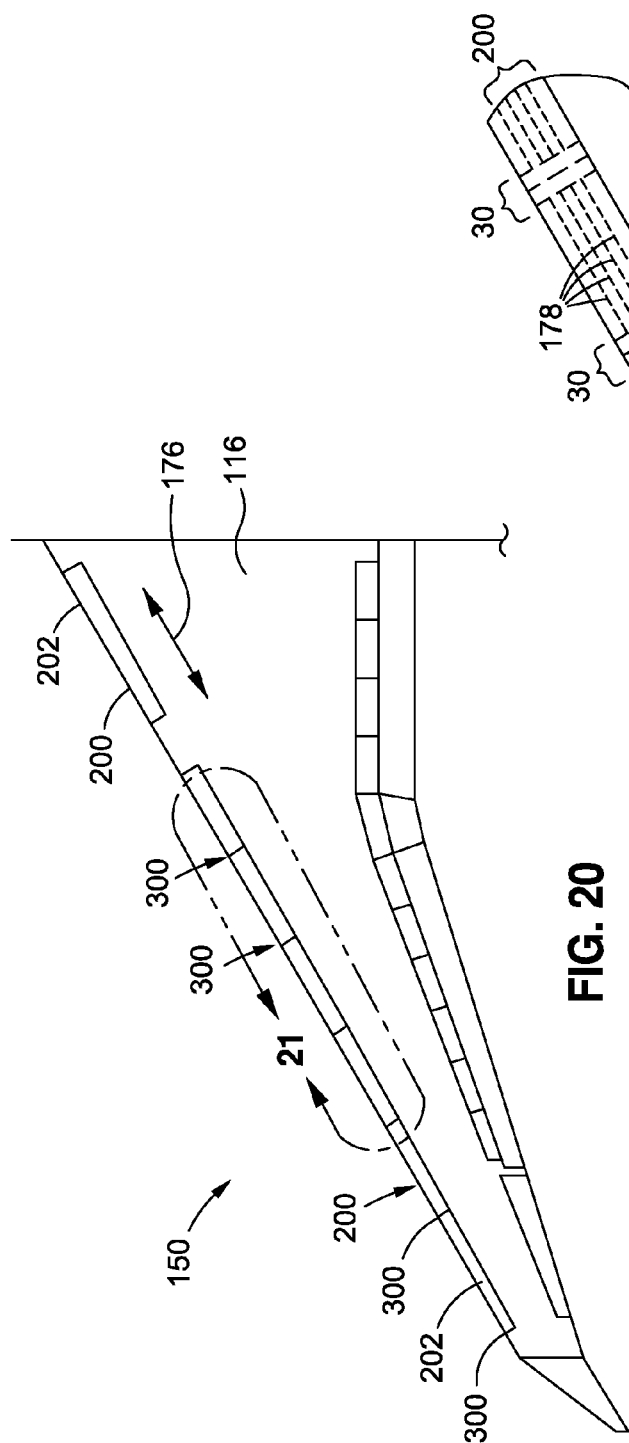
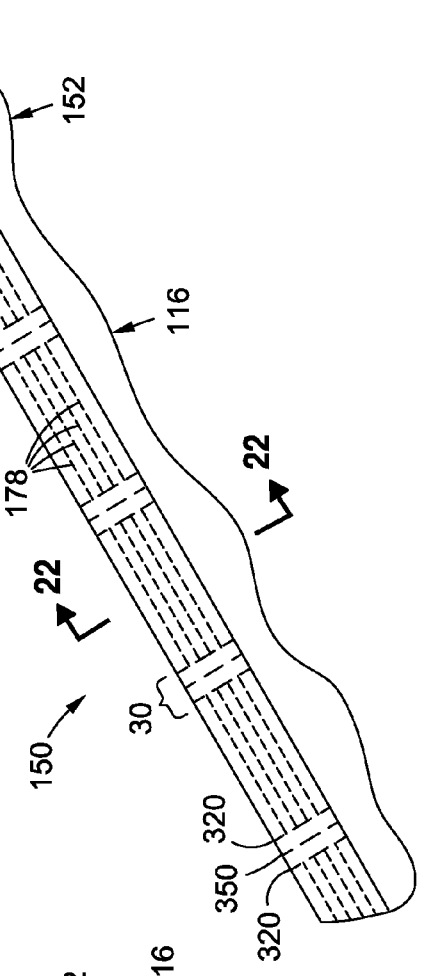
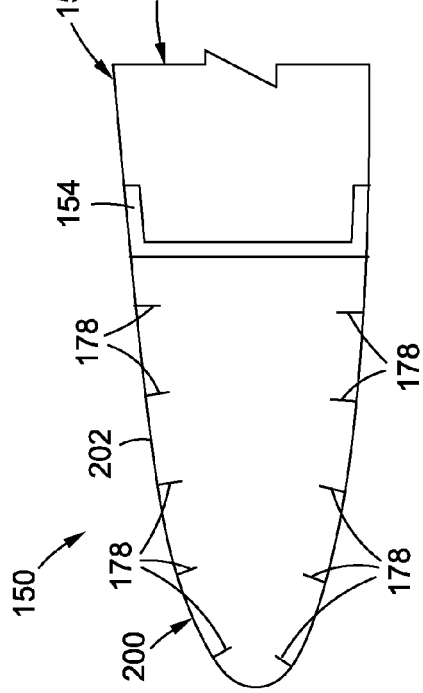
FIG. 20
FIG. 21
FIG. 22

DUAL-RIB MORPHING LEADING EDGE

FIELD

The present disclosure relates generally to airfoils and, more particularly, to a mechanism for changing the shape of an airfoil leading edge.

BACKGROUND

Aircraft typically include a variety of devices for improving the aerodynamic performance of the aircraft during different phases of flight. For example, an aircraft may include leading edge devices mounted to the wing leading edges and which may be deployed during the takeoff, approach, and/or in the landing phase of a flight, and may be retracted during the cruise phase of a flight. By deploying the leading edge devices, airflow may be maintained over the wings at high angles of attack which may allow for a decrease in the speed of an aircraft during takeoff or an increase in the descent angle during approach and/or a reduction in landing speed.

Unfortunately, leading edge devices of conventional aircraft have geometric features that disrupt the flow of air over the wings even when retracted such as during the cruise phase of a flight. For example, conventional leading edge devices may include a step between the aft edge of the leading edge device and the main wing portion when the leading edge device is retracted. When the leading edge device is deployed, a gap may exist between the leading edge device and the main wing portion. The steps and gaps associated with conventional leading edge devices may cause laminar flow to transition to non-laminar flow over the airfoil. The transition to non-laminar flow may reduce the aerodynamic performance of the aircraft. In addition, steps and gaps associated with conventional leading edge devices may generate noise that may add to the aircraft noise during takeoff and landing. Furthermore, steps and gaps associated with conventional leading edge devices may cause vibration and flutter which, over time, may have an undesirable effect on actuating mechanisms for leading edge devices.

As can be seen, there exists a need in the art for a leading edge of an airfoil that may reduce or avoid the existence of geometric features causing laminar flow to transition to non-laminar flow.

SUMMARY

The above-noted needs associated with airfoil leading edges are specifically addressed by the present disclosure which provides a mechanism for changing the shape of a leading edge of an airfoil. The mechanism may include a first rib and a second rib. The first rib may include a plurality of first rib segments. The first rib may move between a first folded shape and a first extended shape. The second rib may include a plurality of second rib segments. The second rib may move between a second folded shape and a second extended shape. An actuator may be coupled to the first rib, the second rib, or both, to move the first rib, the second rib, or both, between their respective folded and extended shapes.

Also disclosed is an airfoil which may include a leading edge having a flexible leading edge skin. The leading edge skin may have a first end, a second end, and an arc length defined therebetween. The airfoil may include a first rib having a plurality of first rib segments and which may move between a first folded shape and a first extended shape. The second rib may include a plurality of second rib segments and which may move between a second folded shape and a second extended shape. The first and second rib segments may be operable to transition the flexible leading edge skin from a first curvature profile associated with the first extended shape to a second curvature profile associated with the second extended shape without a change in the arc length.

Also disclosed is a method of changing a camber of an airfoil. The method may include moving a first rib of an airfoil from a first folded shape to a first extended shape. The first rib may include a plurality of first rib segments pivotably coupled to one another. The method may further include moving a second rib of the airfoil from a second extended shape to a second folded shape. The second rib may include a plurality of second rib segments pivotably coupled to one another. The movement of the second rib from the second extended shape to the second folded shape while moving the first rib from the first folded shape to the first extended shape may transition a flexible leading edge skin of the airfoil from a second curvature profile of the airfoil to a first curvature profile of the airfoil. The first curvature profile may be associated with the first extended shape and the second curvature profile may be associated with the second extended shape.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 20 is a plan view of an aircraft wing having a plurality of mechanisms located at spaced intervals along a spanwise direction;

FIG. 21 is a plan view of a portion of a leading edge of the aircraft wing taken along line 21 of FIG. 20 and illustrating spanwise stiffeners that may be included on an inner side of the leading edge skin;

FIG. 22 is a sectional view of the aircraft wing taken along line 22 of FIG. 21 and illustrating spanwise stiffeners mounted to the inner side of the leading edge skin;

DETAILED DESCRIPTION

Figure 1:
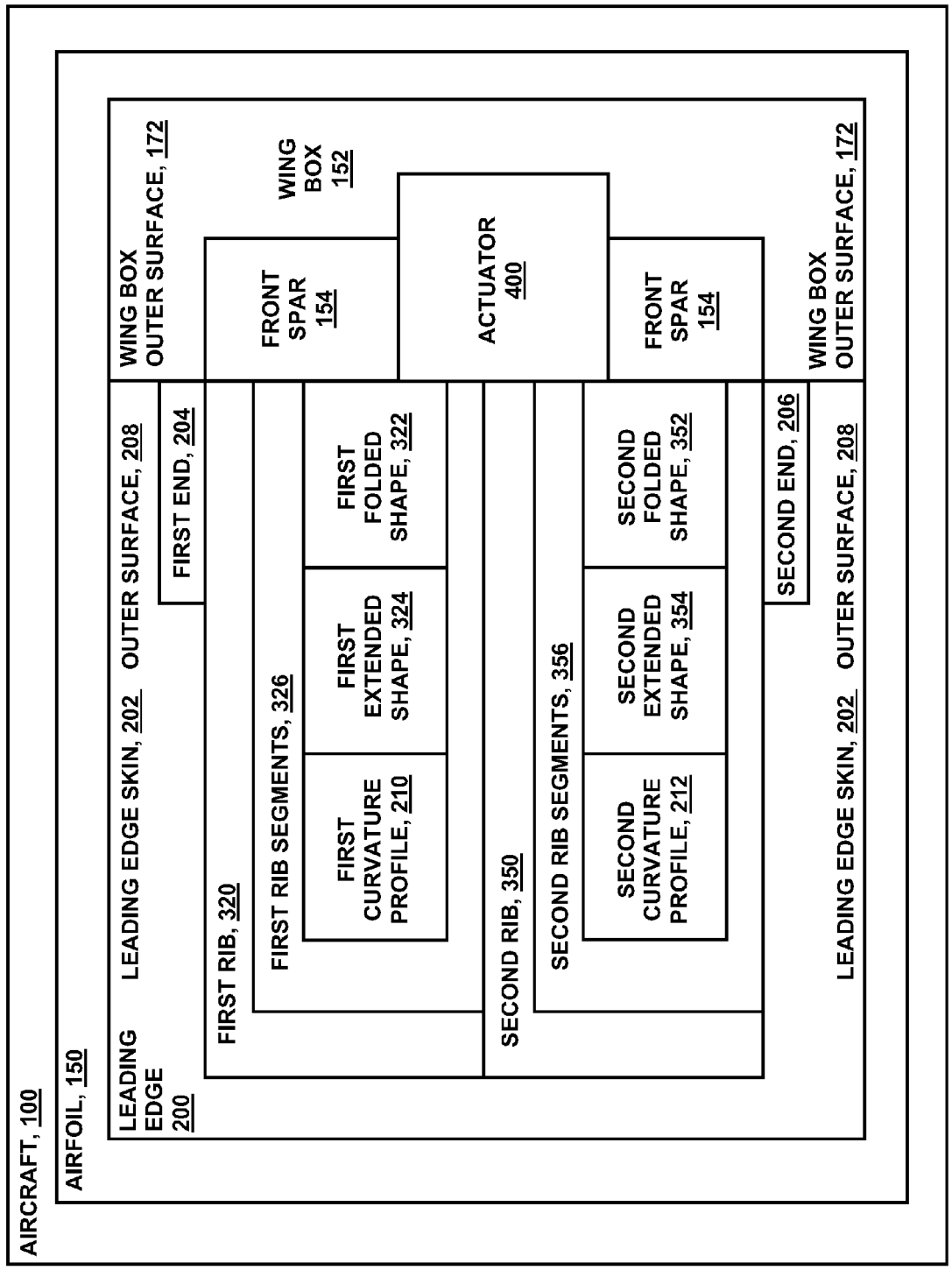
FIG. 1 is a block diagram of an aircraft having a mechanism for changing the shape of a leading edge of an airfoil.

Referring now to the drawings wherein the showings are for purposes of illustrating various examples of the present disclosure, shown in FIG. 1 is a block diagram of an aircraft 100 having a mechanism 300 for changing the shape of a leading edge 200 of an airfoil 150. The leading edge 200 may be a leading edge 200 of a wing 116 or any other type of airfoil 150. The mechanism 300 may include a first rib 320 and a second rib 350. The first rib 320 and the second rib 350 may be mounted within an interior of the leading edge 200 bounded by a flexible leading edge skin 202. The first rib 320 and the second rib 350 may be mounted to a fixed supporting structure such as a wing box 152 of a wing 116. For example, the first rib 320 and the second rib 350 may be mounted to a front spar 154 of a wing box 152.

The first rib 320 may include a plurality of first rib segments 326 which may be pivotably connected in series and configured to move between a first folded shape 322 and a first extended shape 324. Likewise, the second rib 350 may include a plurality of second rib segments 356 which may be pivotably connected in series and configured to move between a second folded shape 352 and a second extended shape 354. The first and second rib segments 326, 356 may be operable to transition the flexible leading edge skin 202 from a first curvature profile 210 associated with the first extended shape 324 to a second curvature profile 212 associated with the second extended shape 354. The first rib segments 326 in the first folded shape 322 may fit within the second extended shape 354 or second curvature profile 212 of the leading edge skin 202. Likewise, the second rib segments 356 in the second folded shape 352 may fit within the first extended shape 324 or first curvature profile 210 of the leading edge skin 202.

The leading edge skin 202 may have a first end 204, a second end 206, and an arc length extending between the first end 204 and second end 206. The first and second rib segments 326, 356 may transition the leading edge skin 202 from the first curvature profile 210 to the second curvature profile 212 without a change in the arc length of the leading edge skin 202. The outer surface 208 of the leading edge skin 202 may be continuous from a first side 160 (e.g., an upper side) of the wing box 152 to a second side 162 (e.g., a lower side) of the wing box 152. The leading edge skin 202 may provide a non-interrupted, smooth, outer surface 208 that is continuous with the outer surfaces 172 (e.g., the outer skins) of the wing box 152 on the first side 160 and/or on the second side 162 of the wing box 152.

In FIG. 1, the leading edge skin 202 may be supported from within by the first rib segments 326 and the second rib segments 356. In this regard, the first and second rib segments 326, 356 may be non-fastened to the leading edge skin 202, and may be moved into contact with the inner surface of the leading edge skin 202 to support the leading edge skin 202 against aerodynamic pressure acting on the leading edge skin 202. The mechanism 300 may include one or more actuators 400 which may be mounted to the wing box 152 such as to the front spar 154. A plurality of first and second linkages 338, 368 may couple the one or more actuators 400 to the respective first and second rib 320, 350. The one or more actuators 400 may be operative to transition the first and second rib 320, 350 between the respective first and second folded shape 322, 352 and the respective first and second extended shape 324, 354. One or more actuators 400 may be operative to deploy the first rib 320 from the first folded shape 322 to the first extended shape 324 during retraction of the second rib 350 from the second extended shape 354 to the second folded shape 352. Likewise, one or more actuators 400 may be operative to deploy the second rib 350 from the second folded shape 352 to the second extended shape 354 during retraction of the first rib 320 from the first extended shape 324 to the first folded shape 322.

Figure 2:
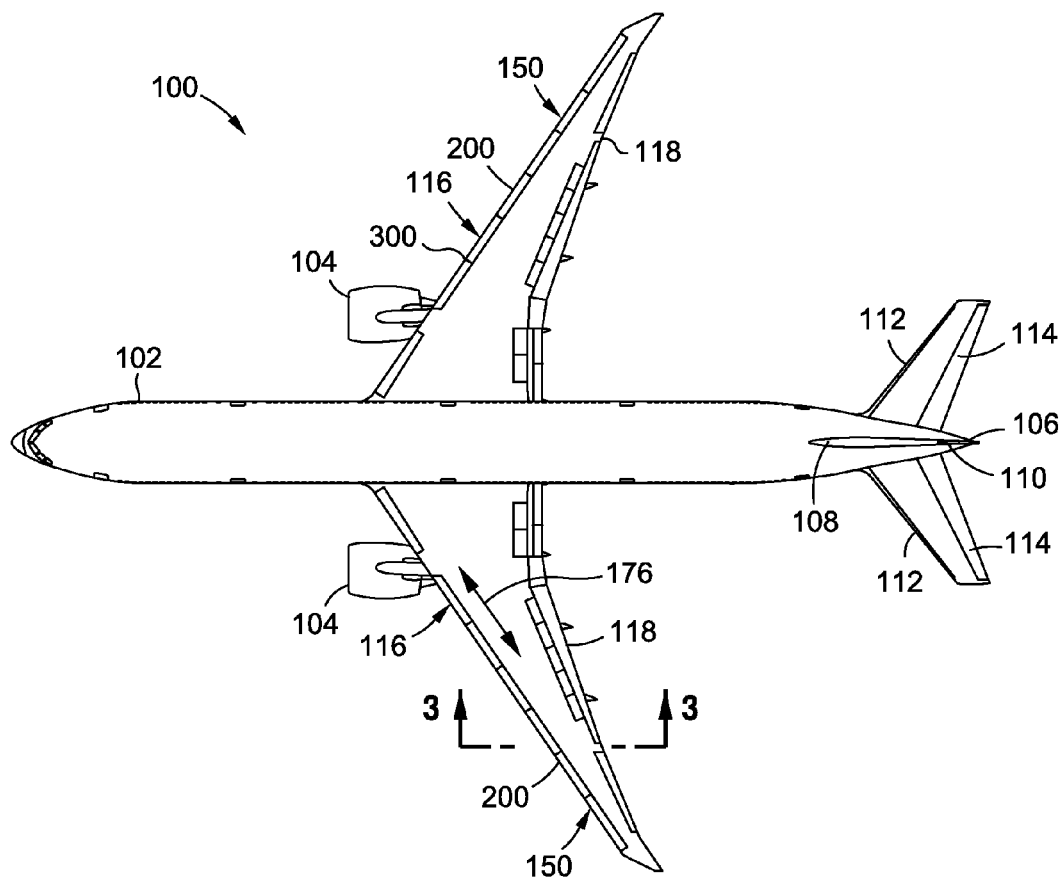
FIG. 2 is a plan view of an example of an aircraft that may include a mechanism as disclosed herein.

FIG. 2 shows an example of an aircraft 100 that may include one or more mechanisms 300 as disclosed herein for changing the shape of a leading edge 200 of an airfoil 150. The aircraft 100 may include a fuselage 102 having a pair of wings 116 attached to the fuselage 102 at a wing root and extending outwardly toward a wing tip. One or more propulsion units 104 may be mounted to the aircraft 100 such as to the wings 116. The aircraft 100 may include an empennage 106 including one or more horizontal stabilizers 112 and elevators 114, and a vertical stabilizer 108 and rudder 110 for directional control of the aircraft 100. In some examples, one or more of the disclosed mechanisms 300 may be implemented on airfoils 150 other than the wings 116 such as the leading edge 200 of a stabilizer such as the horizontal stabilizers 112 or the vertical stabilizer 108.

Although the disclosed mechanism 300 is described in the context of a tube-and-wing aircraft 100 as shown in FIG. 2, one or more mechanisms 300 may be implemented in any aircraft configuration, without limitation, including a blended wing configuration, a hybrid wing-body configuration, and other aircraft configurations. One or more of the disclosed mechanism 300 may also be implemented on a leading edge 200 of a nacelle (not shown) of an engine inlet, allowing portions of the nacelle leading edge 200 to morph into a drooped shaped as a means to delay or avoid flow separation at high angles of attack. The mechanism 300 for changing the shape of a leading edge 200 may also be implemented in vehicles other than aircraft 100. For example, the mechanism 300 may be implemented on missiles, rockets, rotorcraft, and on rotor blades and propellers. In this regard, the disclosed mechanism 300 may be implemented in any vehicular application, without limitation, including any marine, land, air, and/or space vehicle. The disclosed mechanism 300 may also be implemented on any non-vehicular application such as on the blades of a wind turbine.

Figure 3:
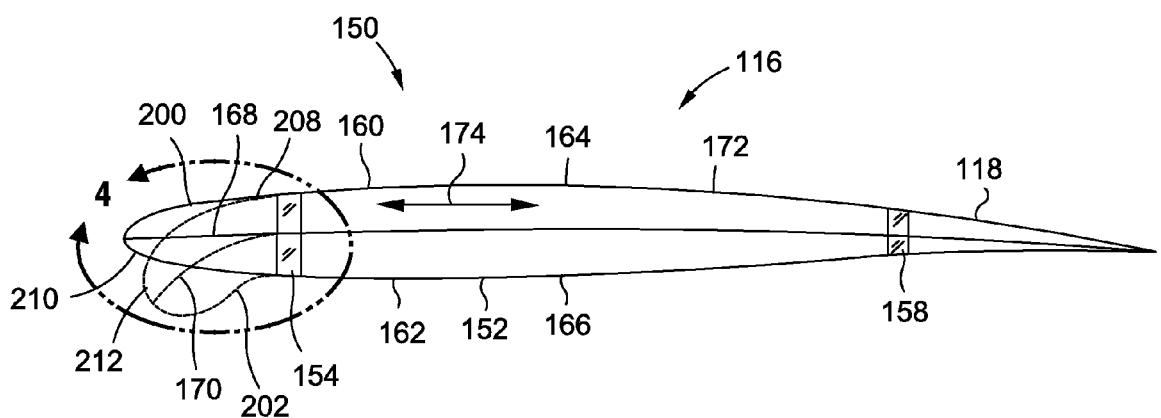
FIG. 3 is a sectional view of a wing taken along line 3 of FIG. 2 and illustrating a leading edge skin having a first curvature profile (shown in solid lines) and changeable to a second curvature profile (shown in dashed lines) using the mechanism disclosed herein.

FIG. 3 shows a cross section of an airfoil 150 such as a wing 116 of an aircraft 100. In the example shown, the wing box 152 may include a front spar 154 and a rear spar 158. The wing box 152 may also include additional structure not shown such as internal ribs, stringers, and outer skins forming the upper and lower surfaces of the wing box 152. The airfoil 150 may include a first side 160 defining a wing upper surface 164, and a second side 162 defining a wing lower surface 166. In FIG. 3, the leading edge skin 202 is shown as a solid line in a first curvature profile 210 which may be described as a high-speed profile suitable for cruise flight. The mechanism 300 may transition the leading edge skin 202 into a second curvature profile 212 shown in FIG. 3 as a dashed line and which may be described as a high-lift profile suitable for low-speed flight such as for takeoff and/or landing. As indicated above, the first and second ribs 320, 350 may transition the leading edge skin 202 from the first curvature profile 210 to the second curvature profile 212, and any shape in between, without a change in the arc length of the leading edge skin 202.

In FIG. 3, the airfoil 150 has a camber line that may change as the leading edge skin 202 transitions between the first curvature profile 210 and the second curvature profile 212. As known in the art, the camber line of an airfoil 150 extends along the vertical center of the airfoil 150 and is equidistant from the top surface and the bottom surface of the airfoil 150 from the leading edge 200 to the trailing edge 118. In some examples, the camber may increase (i.e., may become more sharply curved) as the leading edge skin 202 transitions from the first curvature profile 210 to the second curvature profile 212. For example, the airfoil 150 may change from a relatively shallow curvature first camber 168 when the leading edge skin 202 is in the first curvature profile 210, to an increased curvature (i.e., smaller radius) second camber 170 at the leading edge 200 when the leading edge skin 202 is in the second curvature profile 212.

In addition, the airfoil 150 has a thickness that may change as the leading edge skin 202 transitions from the first curvature profile 210 to the second curvature profile 212. For example, the leading edge 200 may change from a relatively narrow thickness profile of the leading edge skin 202 in the first curvature profile 210 to a relatively blunt thickness profile in the second curvature profile 212. Although described in the context of a leading edge 200 morphing from a relatively small-radius first curvature profile 210 for a high-speed flight regime, to a relatively large-radius second curvature profile 212 for a low-speed flight regime, the leading edge 200 may be configured to transition between any one of a variety of different profiles or geometries, without limitation, and for any flight regimes, and is not limited to transitioning between a small-radius first curvature profile 210 and a large-radius second curvature profile 212 for a respective high-speed flight regime and low-speed flight regime.

Figure 4:
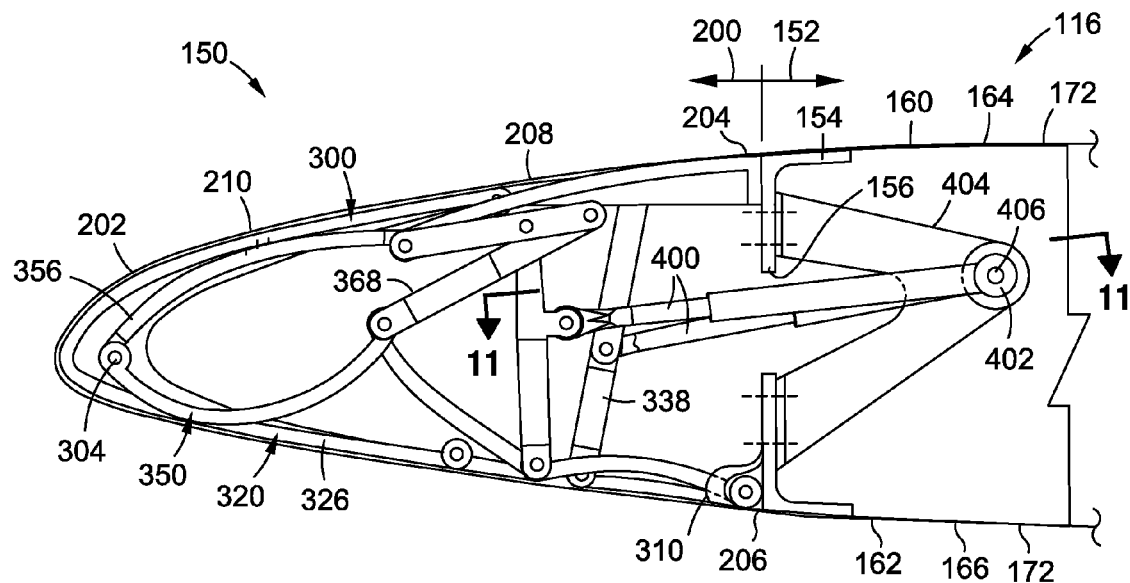
FIG. 4 is a sectional view of a leading edge taken along line 4 of FIG. 3 and showing an example of a mechanism having a first rib in a first extended shape associated with the first curvature profile and further showing a second rib in a second folded shape.

FIG. 4 shows a leading edge 200 having a first rib 320 fully deployed in a first extended shape 324 associated with the first curvature profile 210 and further showing a second rib 350 in a second folded shape 352. The first curvature profile 210 of the leading edge skin 202 may be associated with high-speed flight. The leading edge 200 of the wing 116 may be described as the portion located forward of the wing box 152. The mechanism 300 may include a first rib 320 which is shown in a first extended shape 324 associated with the first curvature profile 210, and a second rib 350 which is shown in a second folded shape 352. As indicated above, the first rib 320 may include a plurality of first rib segments 326, and the second rib 350 may include a plurality of second rib segments 356. Each one of the first rib segments 326 may be pivotably coupled to an adjacent first rib segment 326 by a hinge pin 308 extending through a pin bore formed in the joined ends of the rib segments to form a rib hinge 304. The first rib segments 326 may be transitioned between the first extended shape 324 and the first folded shape 322 by a plurality of first linkages 338 coupling the first rib segments 326 to one or more actuators 400. Likewise, the second rib segments 356 may be pivotably coupled together by a plurality of rib hinges 304, and may be transitioned between the second extended shape 354 and the second folded shape 352 by a plurality of second linkages 368 coupling the second rib segments 356 to one or more actuators 400.

The actuators 400 may be directly or indirectly supported by the wing box 152. For example, the actuators 400 may be supported by an actuator support bracket 404 that may be mounted to the front spar 154. In the example shown, the actuator support bracket 404 may be mounted on a side of the front spar 154 opposite the first and second ribs 320, 350. The end fitting 402 of each one of the actuators 400 may be coupled to the actuator support bracket 404 by one or more actuator pins 406. In the example shown, each actuator 400 may be a linear actuator 400 having a piston axially extendable out of the cylinder and coupled to the first and second rib segments 326, 356 by the respective first and second linkages 338, 368. The piston and/or cylinder of each one of the actuators 400 may extend through a cutout 156 that may be locally formed in the front spar 154 (see e.g., FIG. 10). However, in an example not shown, the actuators 400 may be mounted on a front side of the front spar 154 and/or may be generally contained within the leading edge 200 of the airfoil 150.

One or more actuators 400 may be configured to move the first rib 320 and the second rib 350 between the respective first and second extended and folded shapes 322, 324, 352, 354. In this regard, a single actuator 400 may be configured to move the second rib 350 into the second extended shape 354 while moving the first rib 320 into the first folded shape 322. Likewise, a single actuator 400 may be configured to move the first rib 320 into the first extended shape 324 while moving the second rib 350 into the second folded shape 352. In other examples, two or more actuators 400 may be used to deploy and retract a single rib between the extended and folded shape. The second linkages 368 may fit within the first extended shape 324 when the second rib segments 356 are in the second folded shape 352. Likewise, as shown in FIG. 4, the first linkages 338 may fit within the second extended shape 354 when the first rib segments 326 are in the first folded shape 322.

Although shown in the figures as linear actuators, one or more of the actuators 400 may be provided as a rotary actuator for rotating one or more bell cranks (not shown) coupled to the first and second rib segments 326, 356 to convert rotary motion of the actuator into linear motion to actuate the first and second ribs 320, 350 between their respective first and second extended and folded shape 322, 324, 352, 354. As may be appreciated, the actuator(s) 400 may be provided in any one of a variety of different configurations for transitioning the first and second rib 320, 350 between the respective first and second extended and folded shape 322, 324, 352, 354. Although each one of the first and second ribs 320, 350 is shown having a dedicated actuator 400, a single actuator (not shown) 400 may be configured to actuate both the first rib 320 and the second rib 350 in a coordinated manner between their respective folded and extended shapes 322, 324, 352, 354 to transition the leading edge skin 202 between the first and second curvature profile 210, 212.

As indicated above, the first rib segments 326 may be non-fastened to the leading edge skin 202, and may be moved into contact with the inner surface of the leading edge skin 202 to support the leading edge skin 202 against positive aerodynamic pressure acting on the leading edge skin 202 while the second rib segments 356 are collapsed into a compact second folded shape 352 that fits within the envelope of the first extended shape 324. Positive aerodynamic pressure may be described as pressure that urges the leading edge skin 202 inward against the ribs. The second rib segments 356 may be non-fastened to the leading edge skin 202, and may be moved into contact with the inner surface of the leading edge skin 202 to support the leading edge skin 202 against positive aerodynamic pressure acting on the leading edge skin 202 while the first rib segments 326 are collapsed into a compact first folded shape 322 that fits within the envelope of the second extended shape 354. Negative aerodynamic pressure may be described as pressure that tends to pull the leading edge skin 202 away from the ribs (e.g., suction forces). Negative aerodynamic pressure may be resisted by in-plane tension forces in the leading edge skin 202 when the rib segments are in contact with the inner surface of the leading edge skin 202. The first rib segments 326 in the first extended shape 324 may support the leading edge skin 202 in a high-speed, cruise profile (see e.g., the first curvature profile 210 in FIG. 4). The second rib segments 356 in the second extended shape 354 may support the leading edge skin 202 in a low-speed, high-lift profile for low-speed flight (see e.g., the second curvature profile 212 in FIG. 8).

The leading edge skin 202 may be flexible to facilitate dynamic changes in the curvature of the leading edge skin 202 along a chordwise direction 174 during the transition of the leading edge skin 202 between the first curvature profile 210 and the second curvature profile 212. As indicated above, the outer surface 208 of the leading edge skin 202 may be continuous from a first side 160 of the wing box 152 to a second side 162 of the wing box 152. In addition, the outer surface 208 of the leading edge skin 202 may be tangent to an outer surface 172 of the airfoil 150 at the wing box 152 on both sides of the airfoil 150 when the leading edge skin 202 is in the first curvature profile 210 and in the second curvature profile 212. In some examples, the first end 204 and/or the second end 206 of the leading edge skin 202 may be fixedly coupled to the wing box 152. In other examples, the first end 204 and/or the second end 206 of the leading edge skin 202 may be integral with the forward ends (not shown) of an outer skin (not shown) of the wing box 152 on the first side 160 (e.g., upper side) and/or the second side 162 (e.g., lower side) of the wing box 152. The first end 204 and the second end 206 of the leading edge skin 202 may be described as the location where the leading edge skin 202 transitions to the wing box 152, and may not necessarily be the locations where the leading edge skin 202 physically terminates. Regardless of the configuration of the leading edge skin 202 and the manner in which the first end 204 and the second end 206 transition to the wing box 152, the outer surface 208 of the leading edge skin 202 may be continuous with and tangent to the outer surfaces 172 (FIG. 4) of the wing box 152.

Any one or more of the various examples of the leading edge 200 disclosed herein may provide for transitioning the leading edge skin 202 from the first curvature profile 210 to the second curvature profile 212 in a manner avoiding steps, gaps, and/or abrupt changes or kinks in the curvature in the outer surface 208 of the leading edge skin 202 and the wing box 152 on both sides of the airfoil 150. The avoidance of such steps, gaps, and/or abrupt changes or kinks in the curvature may avoid a transition of airflow from laminar flow to non-laminar flow over the airfoil 150. By maintaining laminar flow over both sides (e.g., the upper and lower side) of the airfoil 150 and avoiding non-laminar flow, the aerodynamic performance of the airfoil 150 may be improved. In addition, airframe noise of the airfoil 150 in the low-speed profile (see e.g., FIG. 8) may be reduced by avoiding separated flow and/or high-speed turbulent flow that may otherwise be generated by conventional, discrete leading edge devices such as slats and Krueger flaps (not shown). The leading edge 200 may remain continuous with the wing box 152, and may avoid steps, gaps, and/or abrupt changes in curvature or kinks in the leading edge skin 202 at the location where the leading edge skin 202 meets the wing box 152. The leading edge 200 may remain continuous with the wing box 152 with no steps, gaps, and/or kinks in the curvature of the outer surface the while the curvature profile of the leading edge skin 202 morphs within a fixed arc length.

FIGS. 4-8 show the progression in the transition of the leading edge skin 202 from the first curvature profile 210 to the second curvature profile 212 by retracting the first rib 320 from the first extended shape 324 to the first folded shape 322 while deploying the second rib 350 from the second folded shape 352 to the second extended shape 354. FIGS. 4-8 further illustrate that a rib in the folded shape fits within the curvature profile associated with a rib in the extended shape, and also show the approximate shape of the leading edge skin 202 during the transition from the first curvature profile 210 to the second curvature profile 212. In FIG. 4, the leading edge skin 202 conforms to the outer surfaces of the first rib segments 326 in the first extended shape 324. As indicated above, the first rib segments 326 directly support the leading edge skin 202 under positive aerodynamic pressure. For portions of the leading edge 200 that may be subjected to negative aerodynamic pressure (e.g., suction) such as the upper surface 164 of the leading edge 200, chordwise tension (e.g., in-plane tension) in the leading edge skin 202 may resist upward deflection of the skin such that the skin is generally maintained against the outer surface of the first rib segments 326 such that the curvature profile of the leading edge skin 202 is maintained and laminar flow over the airfoil 150 is preserved.

Figure 5:
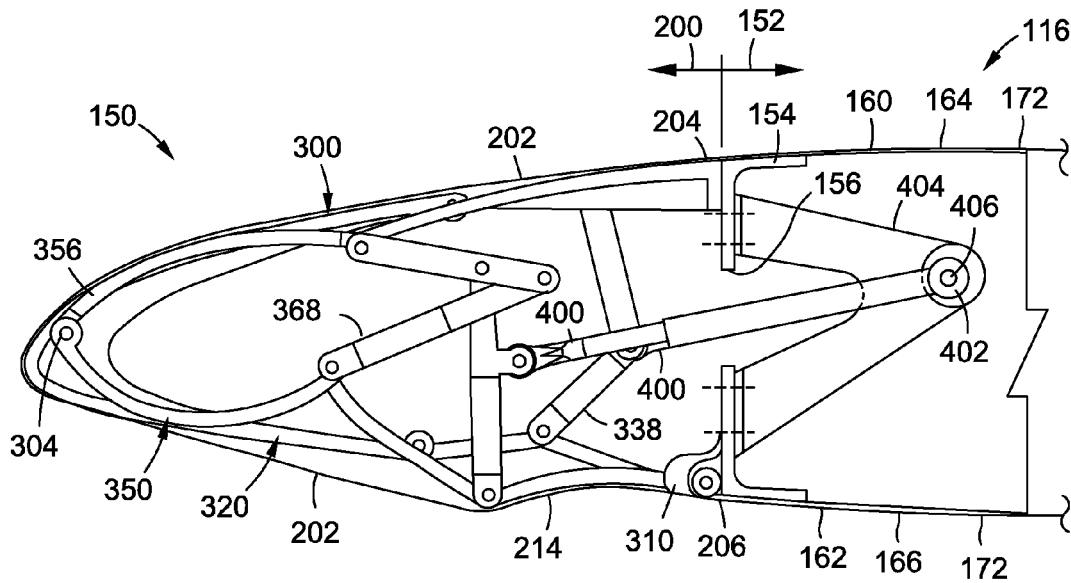
FIGS. 5-7 are sectional views showing the progression in the transition of the leading edge skin from a first curvature profile to a second curvature profile by retracting the first rib from the first extended shape to the first folded shape while deploying the second rib from the second folded shape to the second extended shape.
Figure 8:
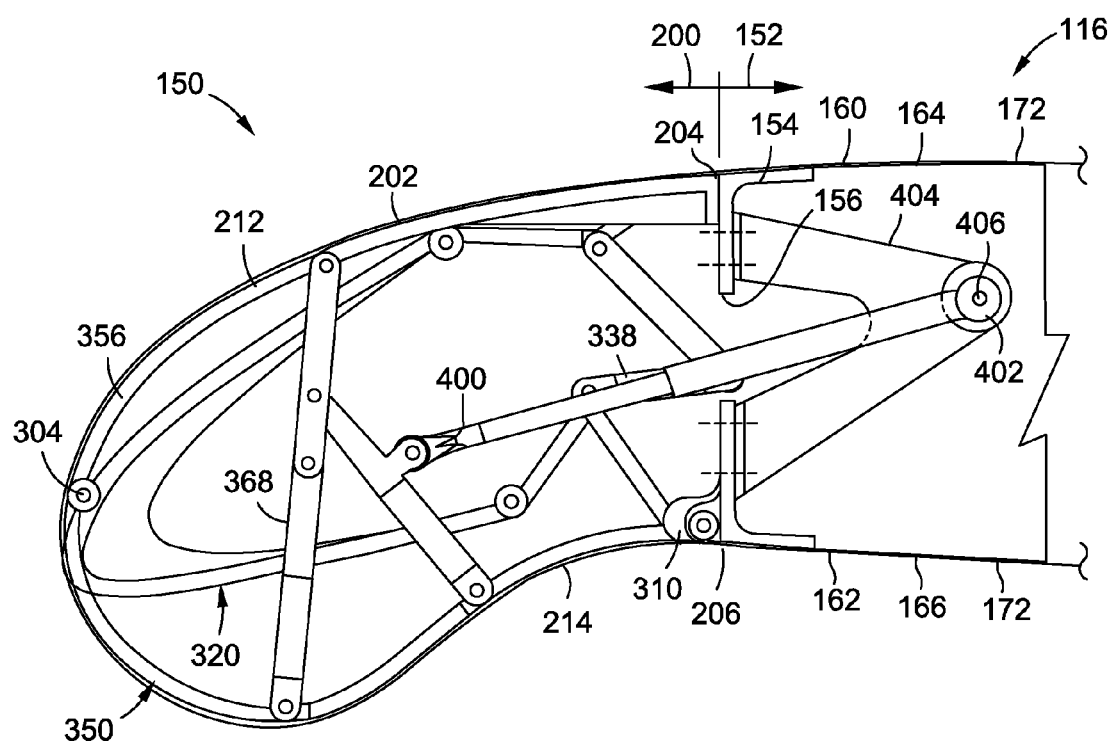
FIG. 8 is a sectional view of the leading edge showing the second rib in the second extended shape associated with the second curvature profile.

FIG. 5 illustrates partial retraction of the first rib 320 from the first extended shape 324 toward the first folded shape, and partial deployment of the second rib 350 from the second folded shape 352 toward the second extended shape 354 during the transition of the leading edge skin 202 from the first curvature profile 210 to the second curvature profile 212. In a lower-forward chordwise location on the leading edge 200, the leading edge skin 202 may bridge across concave areas formed by high points of the second rib segments 356 during the transition. In some locations such as a lower-aft chordwise location on the leading edge 200, the leading edge 200 may be pre-formed with a local concavity 214. For example, in FIG. 5, a local concavity 214 may be pre-formed in an aft lower portion of the leading edge skin 202. By pre-forming the local concavity 214, the leading edge skin 202 may avoid bridging across the concave lower surface 166 when the leading edge skin 202 is in the second curvature profile (FIG. 8). Such bridging of the leading edge skin 202 may otherwise occur if the leading edge skin 202 were flat or planar in the zero-stress state at the lower-aft chordwise location.

Figure 6:
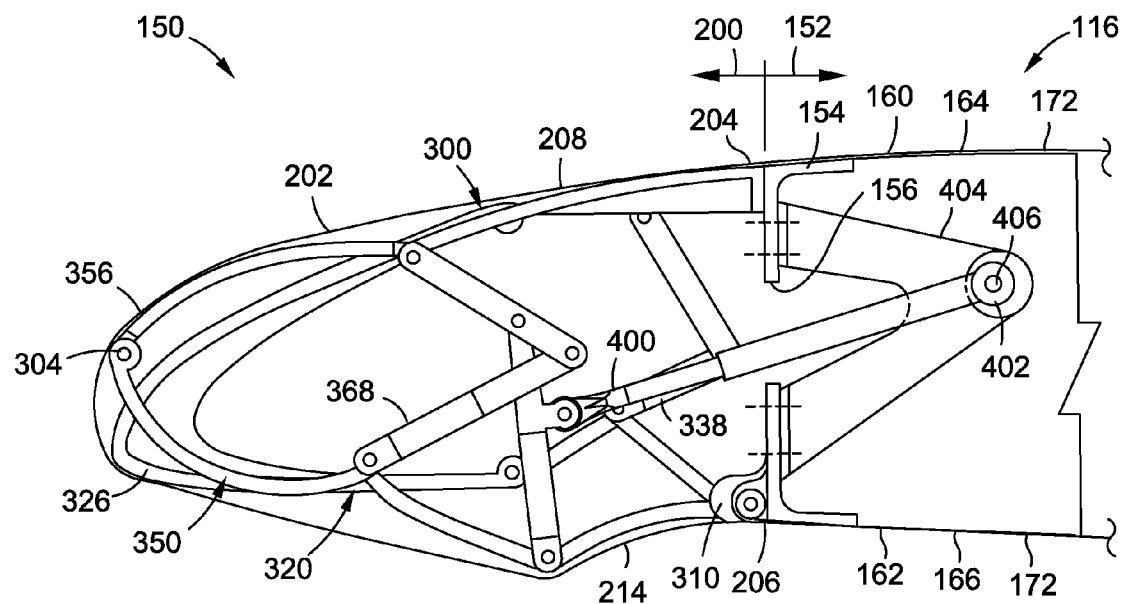
Figure 7:
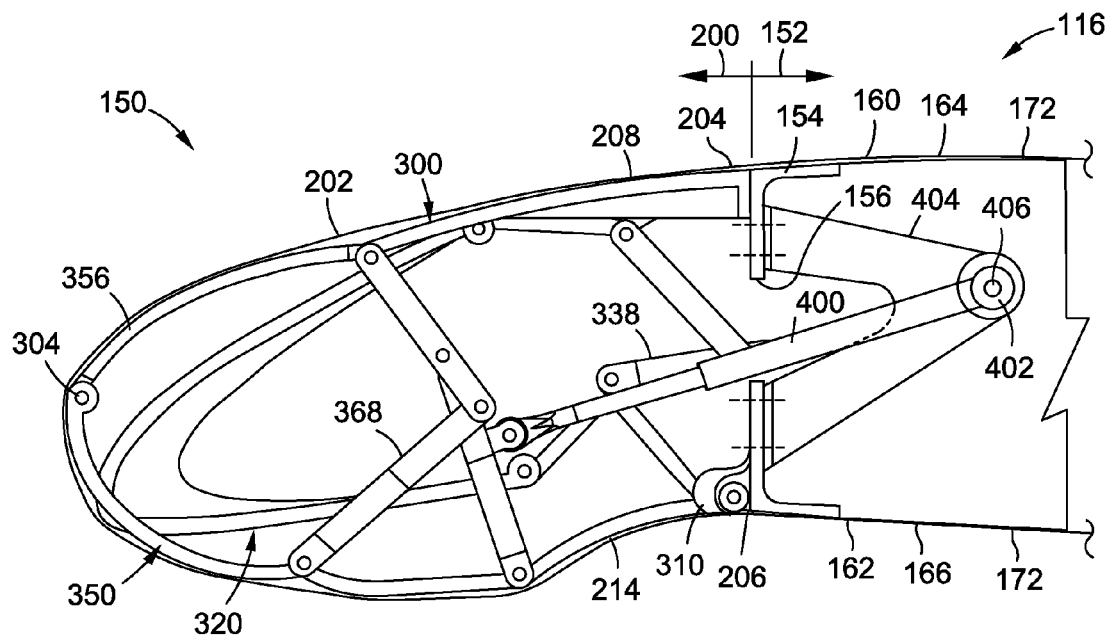

FIG. 6 illustrates further retraction of the first rib 320 toward the first folded shape 322, and further deployment of the second rib 350 toward the second extended shape 354. In an upper-forward chordwise location on the leading edge 200, the leading edge skin 202 may bridge across another concave area that may be formed by high points of the second rib segments 356 during the transition of the leading edge skin 202. FIG. 7 illustrates even further retraction of the first rib 320 and further deployment of the second rib 350. FIG. 7 shows that as the second rib 350 approaches the second extended shape 354, the depth of the concave areas formed by the high points of the rib segments may be reduced which may allow the leading edge skin 202 to more closely conform to the combined silhouette of the first and second rib segments 326, 356.

FIG. 8 illustrates the first rib 320 fully-retracted in the first folded shape 322 and the second rib 350 fully deployed into the second extended shape 354. The leading edge skin 202 conforms to the outer surfaces of the second rib segments 356 in the second extended shape 354. The local concavity 214 optionally pre-formed in the aft lower portion of the leading edge skin 202 may conform to the concave shape of the second lower aft segment 366. The second rib segments 356 may directly support the leading edge skin 202 under positive aerodynamic pressure. As indicated above, portions of the leading edge 200 under negative aerodynamic pressure (e.g., suction) may resist upward deflection of the leading edge skin 202 due to in-plane tension in the leading edge skin 202 as a result of the curvature of the second rib segments 356 bearing against the inner surface of the leading edge skin 202.

In the second curvature profile 212, the leading edge skin 202 may be a relatively blunt profile suitable for low-speed flight. The first rib segments 326 may fit within the second extended shape 354 when the first rib 320 is in the first folded shape 322. The first linkages 338 may also fit within the second extended shape 354 when the first rib segments 326 are in the first folded shape 322. The actuator 400 for the second rib 350 is shown extended in FIG. 8 and the second linkages 368 are fully deployed. The second curvature profile 212 of the leading edge skin 202 may have an increased camber (i.e., more sharply curved) relative to the camber of the airfoil 150 when the leading edge skin 202 is in the first curvature profile 210 as shown in FIG. 4.

In FIG. 8, the second curvature profile 212 of the leading edge skin 202 may enhance airfoil performance at relatively high angles of attack by preventing flow separation near the leading edge 200. Flow separation may be avoided by the increased camber (i.e., more sharply curved) and substantially larger leading edge radius of the leading edge 200 in the low-speed second curvature profile 212 as compared to the high-speed first curvature profile 210 (e.g., FIG. 4). As indicated above, when the leading edge skin 202 is in the high-speed first curvature profile 210, laminar flow is maintained over the airfoil 150 on both the upper surface (e.g., first side 160) and lower surface (e.g., second side 162) of the airfoil 150. When the leading edge skin 200 is transitioned into the second curvature profile 212, the leading edge 200 provides enhanced airfoil 150 performance in the low-speed flight regime.

The flexible leading edge skin 202 may have a skin thickness that may vary along a chordwise direction 174 of the airfoil 150 to facilitate changes in curvature of the leading edge skin 202 during the transition between the first curvature profile 210 to the second curvature profile 212. The leading edge skin 202 may be provided in a thickness and material based on the range of curvatures over which the leading edge skin 202 may flex during the transition from the first curvature profile 210 in the second curvature profile 212. However, in some examples, the leading edge skin 202 may have a substantially constant thickness along a chordwise direction 174 from the first end 204 to the second end 206.

The leading edge skin 202 may be formed of an isotropic material having a uniform modulus of elasticity. For example, the leading edge skin 202 may be formed of an isotropic material such as a metallic material including aluminum, titanium, or other metallic materials or combinations thereof. However, the isotropic material may be a non-metallic material such as a ceramic material or a polymeric material. In addition, in some examples, the leading edge skin 202 may be formed of one material along a chordwise portion of the leading edge skin 202, and a different material along a different chordwise portion of the leading edge skin 202.

If formed of an isotropic material, the thickness of the leading edge skin 202 may be varied along a chordwise direction 174 in order to provide a desired bending stiffness profile along the arc length of the leading edge skin 202 from the first end 204 to the second end 206. The bending stiffness profile of the leading edge skin 202 along the arc length direction may be selected to maintain the internal stresses in the leading edge skin 202 within the material allowables. In addition, the thickness of the leading edge skin 202 may be selected to provide sufficient bending stiffness along the spanwise direction 176 to prevent excessive deflection of the leading edge skin 202 under aerodynamic pressure at locations where the leading edge skin 202 spans between a set of rib assemblies 302 (see e.g., FIG. 9).

In some examples, the leading edge skin 202 may be a composite skin formed of composite material or other anisotropic material having a non-uniform modulus of elasticity in different directions. For example, the leading edge skin 202 may be a laminate (not shown) of composite plies formed of fiber-reinforced polymer matrix material. Each composite ply in the laminate may include reinforcing fibers that serve as the primary load-carrying constituent of the composite laminate. The reinforcing fibers may be formed of metal, glass, ceramic, carbon or graphite, Kevlar™, or any other type of fiber material, and may be embedded within a thermoplastic or thermosetting polymer matrix material such as an epoxy matrix.

In contrast to an isotropic (e.g., metallic) leading edge skin 202 for which the bending stiffness may be tailored by varying the cross-sectional thickness of the skin along the arc length direction, the bending stiffness of an anisotropic composite laminate leading edge skin 202 may be varied along the arc length by tailoring the properties of the composite material that makes up the composite skin. In this regard, the skin thickness of a composite leading edge skin 202 may be maintained substantially constant along the arc length, and the bending stiffness may be varied by varying the mechanical properties of the composite plies. For example, the relative orientations of the fibers in the different composite plies (e.g., the ply stacking sequence) may be selected to provide a desired bending stiffness profile to the leading edge skin 202 along the arc length direction from the first end 204 to the second end 206 of the leading edge skin 202. The bending stiffness of the composite leading edge skin 202 may be tailored by varying the fiber orientation of the fibers of the plies in a predetermined manner along the arc length direction.

Figure 9:
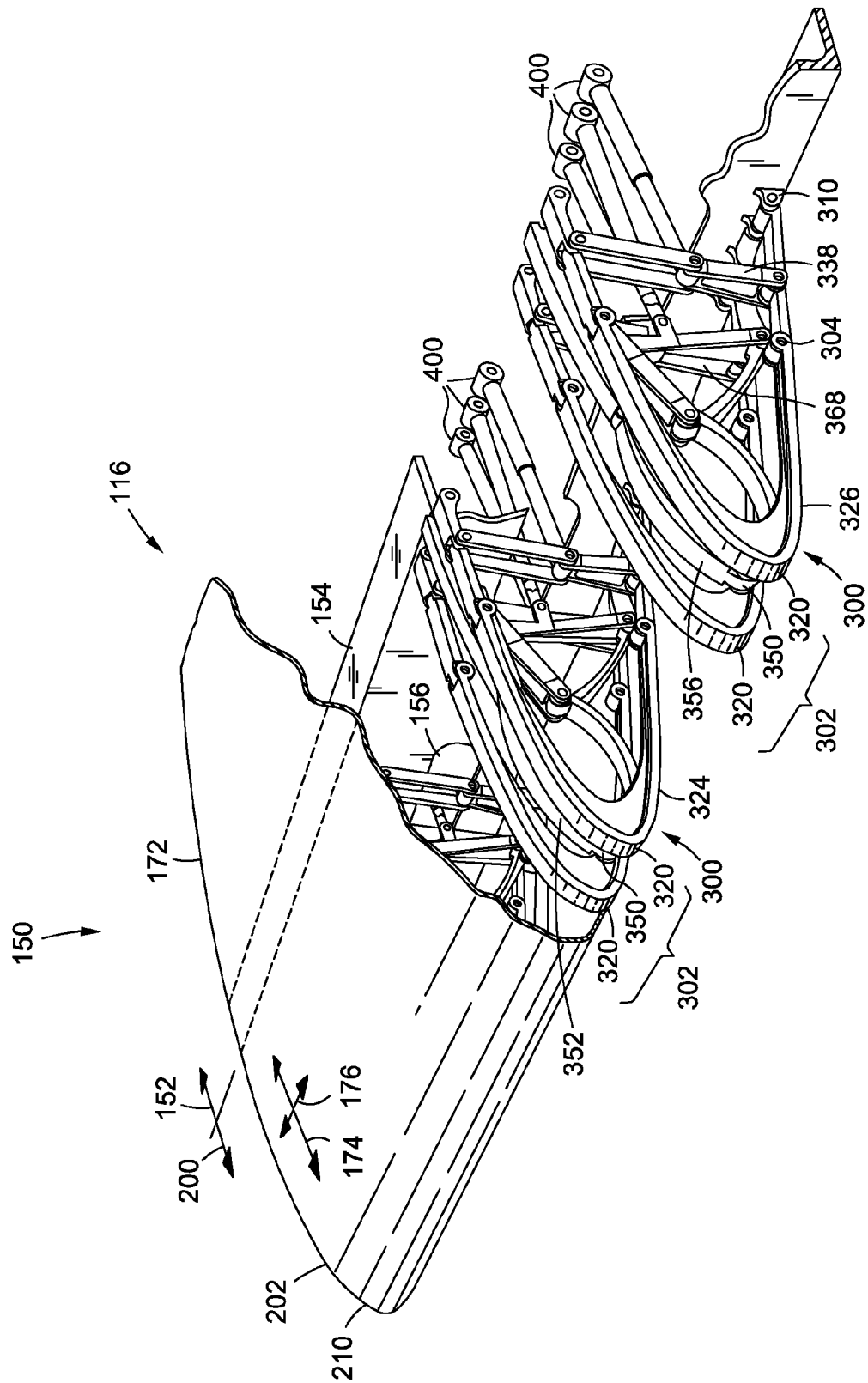
FIG. 9 is a perspective view of a leading edge of an airfoil including a plurality of rib assemblies positioned at spaced intervals along a spanwise direction of the airfoil.

FIG. 9 is a perspective view of a leading edge 200 of an airfoil 150 including a plurality of rib assemblies 302. A rib assembly 302 may include a group of first and second ribs 320, 350. In the example shown, each one of the rib assemblies 302 may include a first rib 320 positioned between a pair of second ribs 350. The rib assemblies 302 are positioned at spaced intervals along a spanwise direction 176 of the airfoil 150. However, a rib assembly 302 may have a different configuration than the configuration shown in FIG. 9. For example, a rib assembly 302 may include a single first rib 320 and a single second rib 350 positioned in relatively close relationship to one another. In another example, a rib assembly 302 may include a second rib 350 positioned between a pair of first ribs 320. In a further example, the leading edge 200 may include alternating first and second ribs 320, 350 positioned in uniformly spaced relation to one another along the spanwise direction 176 of the airfoil 150. As may be appreciated, the first and second ribs 320, 350 may be arranged in any one of a variety of configurations along the spanwise direction 176 of the airfoil 150.

As shown in FIG. 9, the first and second ribs 320, 350 may be implemented in an airfoil 150 of constant chord and constant airfoil section (e.g., constant cross-sectional size and shape) along the spanwise direction 176 such that each one of the first ribs 320 may be substantially the same size and shape, as may each one of the second ribs 350. However, for an airfoil 150 having a tapering chord or a varying airfoil section along the spanwise direction 176, the first and second ribs 320, 350 may be sized and configured in correspondence with the size and shape of the local airfoil section.

In FIG. 9, the leading edge skin 202 is shown as a continuation of the outer skin of the wing box 152 located aft of the leading edge 200. However, on the upper side and/or the lower side of the wing box 152, the leading edge skin 202 may physically terminate at the location where the leading edge 200 transitions to the wing box 152, as indicated above. The leading edge skin 202 may span across any number of ribs 320, 350 or rib assemblies 302, and may have sufficient stiffness or rigidity in the spanwise direction 176 to maintain the aerodynamic curvature profile of the leading edge 200 and transfer aerodynamic pressure and/or lift loads to the first and/or second ribs 320, 350. The leading edge skin 202 may be formed of a different material or the same material as the outer skins of the wing box 152. To assist in transferring loads to the ribs 320, 350, the leading edge skin 202 may include one or more spanwise stiffeners 178 that may extend between spaced ribs, as shown in FIGS. 20-21 and described in greater detail below. Such spanwise stiffeners 178 may be mounted to the leading edge skin 202 and/or the spanwise stiffeners 178 may be integrally formed with the leading edge skin 202, as described below.

Figure 10:
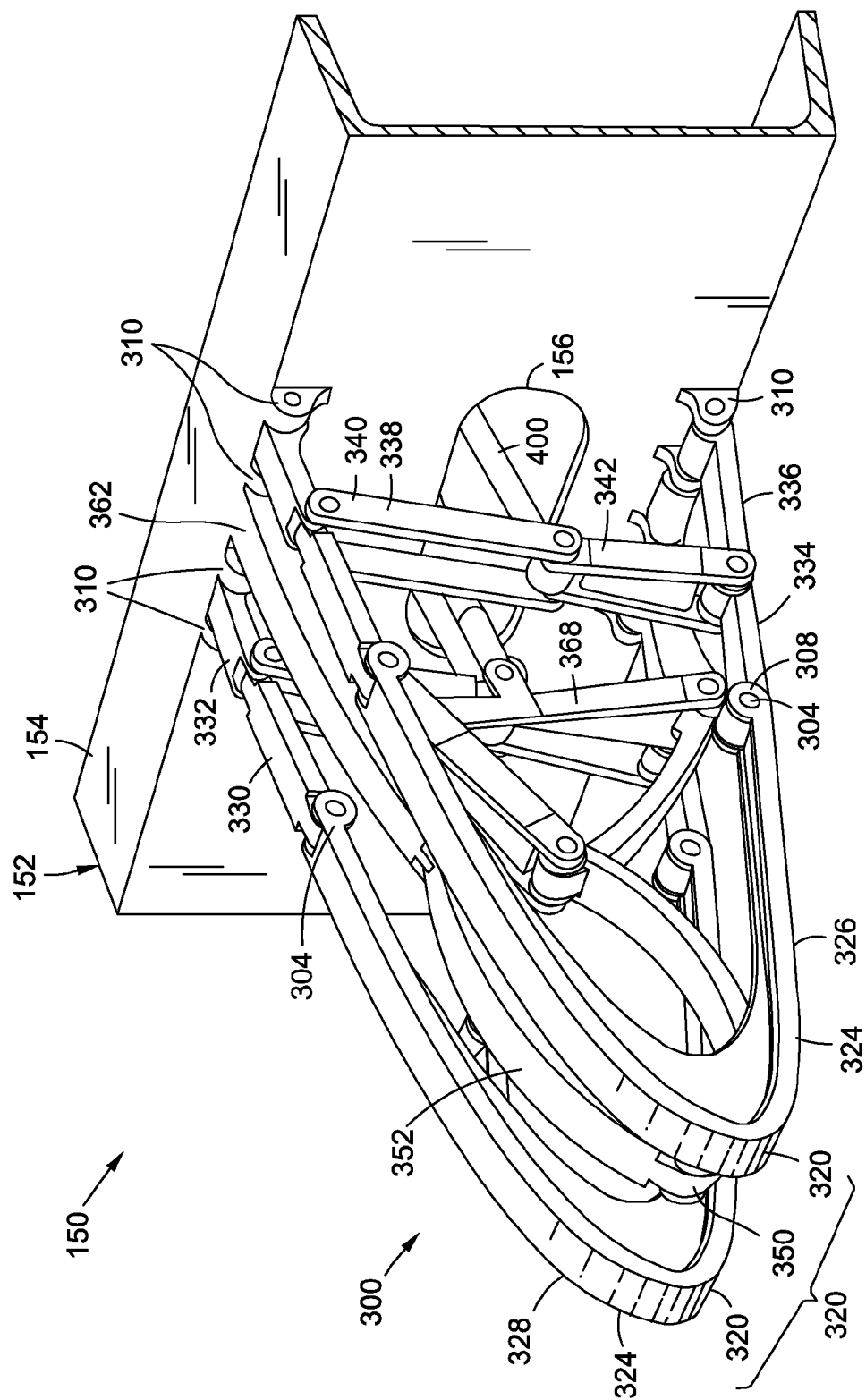
FIG. 10 is a perspective view of an example of a rib assembly mounted to a front spar of an airfoil and including a first rib positioned between a pair of second ribs.

In FIG. 10, shown is an example of a rib assembly 302 including a second rib 350 positioned between a pair of first ribs 320. Each one of the ribs 320, 350 may be attached to the wing box 152. For example, the aft-most rib segments of each one of the first and second ribs 320, 350 may be coupled to the front spar 154. In the example shown, the front spar 154 may include a pair of segment attach tabs 310 at each location where an aft-most rib segment is pivotably coupled to the front spar 154. The pair of segment attach tabs 310 may be spaced apart at a distance complementary to a width of the end of the aft-most rib segment. To couple a rib segment to the front spar 154, a hinge pin 308 may be inserted through a hinge bore formed in the segment attach tabs 310 and the end of the aft-most rib segment. For example, in FIG. 9, the first upper and lower aft segments of each one of the first ribs 320 may be pivotably coupled to a corresponding pair of segment attach tabs 310 extending forwardly from the front spar 154, as described in greater detail below.

In FIG. 10, for the second ribs 350, a second upper fixed segment 362 may be fixedly coupled to the front spar 154. A second lower aft segment 366 may be pivotably coupled to the front spar 154. In some examples, the aft-most rib segments of each rib may be pivotably coupled to the front spar 154 via a hinge pin 308 extending through a pair of segment attach tabs 310. The length of the hinge pin, the width of the end of the aft-most rib segment, and the spacing between the corresponding pair of segment attach tabs 310 may provide resistance against movement of the rib in the lateral or side-to-side direction.

Figure 11:
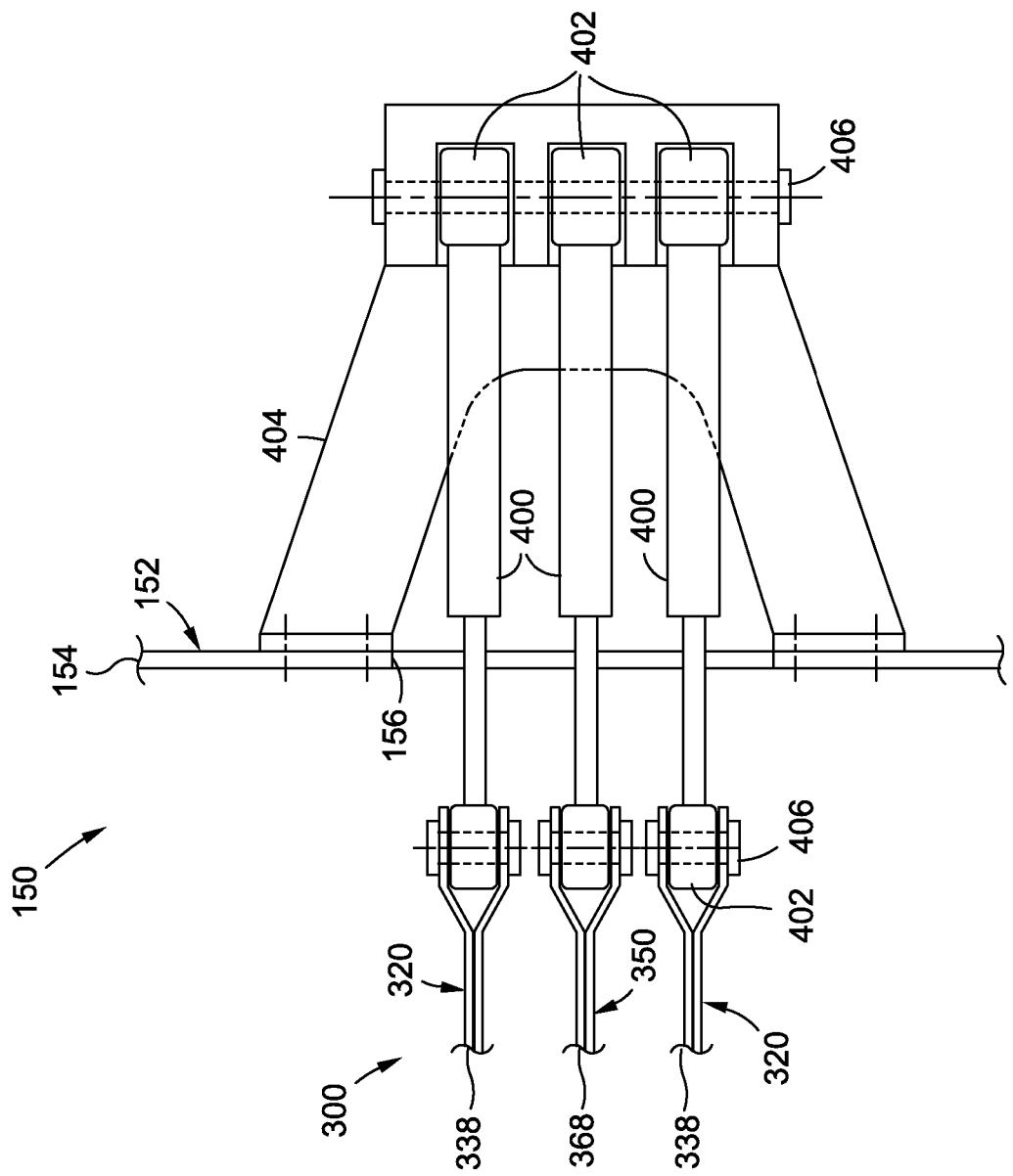
FIG. 11 is a sectional top view of an airfoil taken along line 11 of FIG. 4 and showing a plurality of actuators coupled to the front spar and operative to actuate a respective plurality of first and second ribs.

FIG. 11 is a top view of a plurality of actuators 400. Each one of the actuators 400 may include an opposing pair of end fittings 402. The end fittings 402 may be spherical end fittings 402 or other suitable fitting configurations allowing for a range of motion of the actuators 400 in correspondence with the movement of the ribs 320, 350 between their extended and folded shapes 322, 324, 352, 354. The end fittings 402 on one end of each actuator 400 may be pivotably coupled to an actuator support bracket 404 that may be mounted to the front spar 154. The actuator support bracket 404 may straddle a cutout 156 that may be locally formed in the web of the front spar 154 to allow the actuators 400 to pass through the front spar 154. As indicated above, the actuator support bracket 404 may be provided in any one of a variety of different configurations and may be mounted at any one of a variety of wing box 152 locations, and is not limited to being mounted on an aft side of the front spar 154.

Each one of the actuators 400 may be coupled to the linkages of the ribs 320, 350. For example, a plurality of first linkages 338 may couple an actuator 400 to the first rib segments 326 of the first rib 320. A plurality of second linkages 368 may couple an actuator 400 to the second rib segments 356 of the second rib 350. In the example shown, the end fitting 402 of each actuator 400 may be coupled to a clevis fitting of one of the linkages of a rib using an actuator pin 406. As shown in FIG. 10, the first and second linkages 338, 368 may be configured to straddle the respective rib segments 326, 356 to avoid interfering with movement of the rib segments 326, 356 during the transition of the respective first and second rib 320, 350 between the respective first and second folded and extended shapes 322, 324, 352, 354.

Figure 12:
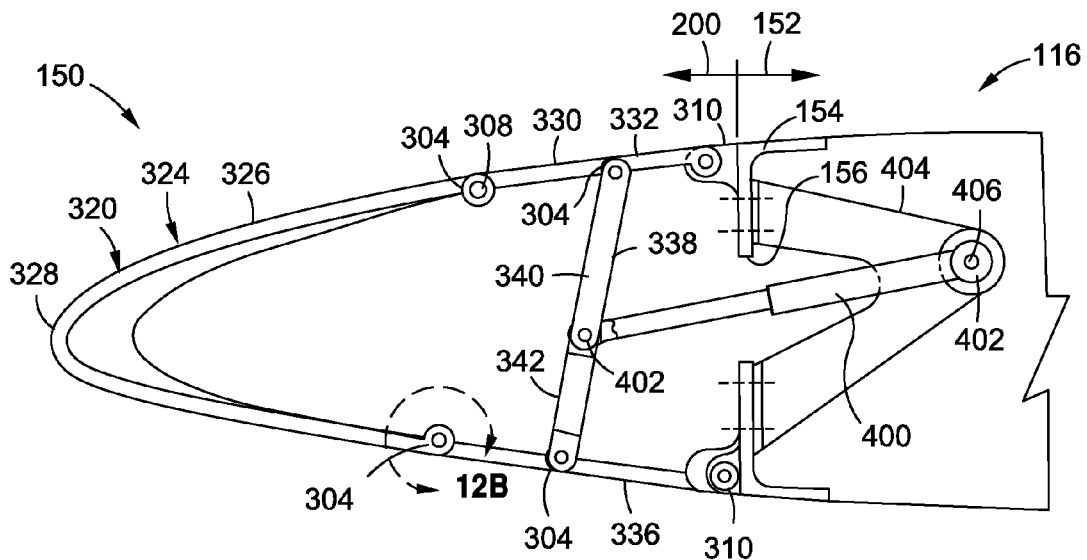
FIG. 12 is a sectional view of an example of a first rib in the first extended shape.

FIG. 12 shows the first rib 320 in the first extended shape 324. The first rib 320 may include a plurality of relatively rigid first rib segments 326. The first rib segments 326 may be pivotably connected to one another in series. Each one of the rib hinges 304 may include a hinge pin 308 extended through a bore formed in the adjoining ends of the first rib segments 326. The first rib segments 326 may transition between the first folded shape 322 and the first extended shape 324 within a single vertical plane which may be oriented approximately orthogonal to a plane defined by the front spar 154 of the wing box 152. The axes of the hinge pins 308 may be oriented generally orthogonal relative to the vertical plane within which the first rib 320 transitions between the first folded and extended shape 322, 324. However, in some examples, the vertical plane of the first rib segments 326 may be oriented generally parallel to a longitudinal axis of the aircraft 100 extending from the nose of the aircraft 100 to the empennage 106 of the aircraft 100. In still other examples, the first rib segments 326 may be actuated in a plane that is non-vertical.

In the example shown, the first rib 320 may include five (5) first rib segments 326 connected in series by rib hinges 304. The first rib segments 326 may include a first upper aft segment 332 and a first lower forward segment 334 which may each be pivotably attached to the front spar 154 such as by using a hinge pin 308 extending through a pair of segment attach tabs 310. The first rib 320 may further include a relatively large first nose segment 328 which may include a partial web to add to the stiffness to the first nose segment 328 and thereby maintain the shape of the leading edge skin 202 in the first curvature profile 210. In some examples, the first nose segment 328 may include a full-depth web connecting the upper and lower sides of the first nose segment 328 and extending from the nose to the aft end of the first nose segment 328 to provide increased stiffness. The first rib 320 may also include a first lower forward segment 334 pivotably coupled to and extending between the first nose segment 328 and the first lower aft segment 336. It should be noted that the first rib 320 may be provided in an arrangement having more or less than five (5) rib segments.

FIG. 12 further illustrates an example of an actuator 400 anchored to the front spar 154 by means of an actuator support bracket 404 as described above. An opposite end of the actuator 400 may be coupled to a pair of first linkages 338. An upper link 340 of the first linkages 338 may be pivotably coupled to the rib hinge 304 coupling the first upper forward segment 330 to the first upper aft segment 332. A lower link 342 of the first linkages 338 may be pivoted coupled to the rib hinge 304 coupling the first lower forward segment 334 to the first lower aft segment 336. The actuator 400 is shown in a fully extended position which corresponds to the first extended shape 324 of the first rib 320.

Figure 12A:
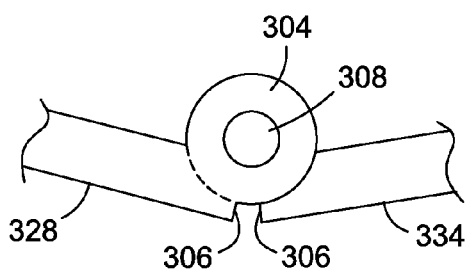
FIG. 12A is a sectional view of a rib hinge pivotably coupling a pair of rib segments using a hinge pin extended through a common hinge bore formed in the ends of the rib segments.
Figure 12B:
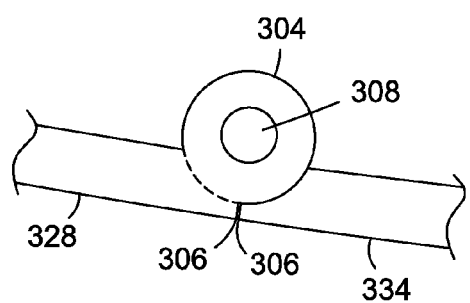
FIG. 12B is a sectional view of the rib hinge of FIG. 12A showing abutting segment end faces of the opposing rib segments to limit the rotational motion of the rib segments.

FIGS. 12A-12B shows an example of a rib hinge 304 as may be used to join rib segments. In the example shown, the rib hinge 304 joins the first lower forward segment 334 to the first nose segment 328. Any one or more of the rib hinges 304 used in the first and/or second ribs 320, 350 may include a rotation-limiting capability such that the rib hinge 304 may be configured to limit the extent of rotation of the joined rib segments relative to one another. For example, the first lower forward segment 334 and the first nose segment 328 may each include a segment end face 306 configured to be placed in abutting contact with one another when the first rib 320 is in the first extended shape 324. As shown in FIG. 12A, the rib segments are free to rotate about the hinge pin 308 until the segment end faces 306 come into contact with one another as shown in FIG. 12B. In FIG. 12B, further rotation will place the segment end faces 306 in compression and the hinge pin 308 in shear, and which may thereby prevent inward deflection of the rib at the rib hinge 304 under positive aerodynamic pressure acting on the leading edge skin 202 at that location of the rib hinge 304.

In some examples, limiting the rotation of the rib hinges 304 may render the rib motion determinant, in the sense that the rotation-limiting capability of the rib hinges 304 may limit the movement of each rib segment to a single path or direction such that the rib segment may be incapable of movement along other paths or directions. The rotation-limiting capability of the rib hinge 304 may be incorporated into other rib hinges 304 of the first rib 320 and/or the second rib 350, and is not limited to the rib hinge 304 joining the first lower forward segment 334 to the first nose segment 328. In addition, the rotation-limiting capability of the rib hinge 304 may be provided using structural configurations other than or in addition to abutting contact between segment end faces 306 of a coupled pair of rib segments.

Figure 13:
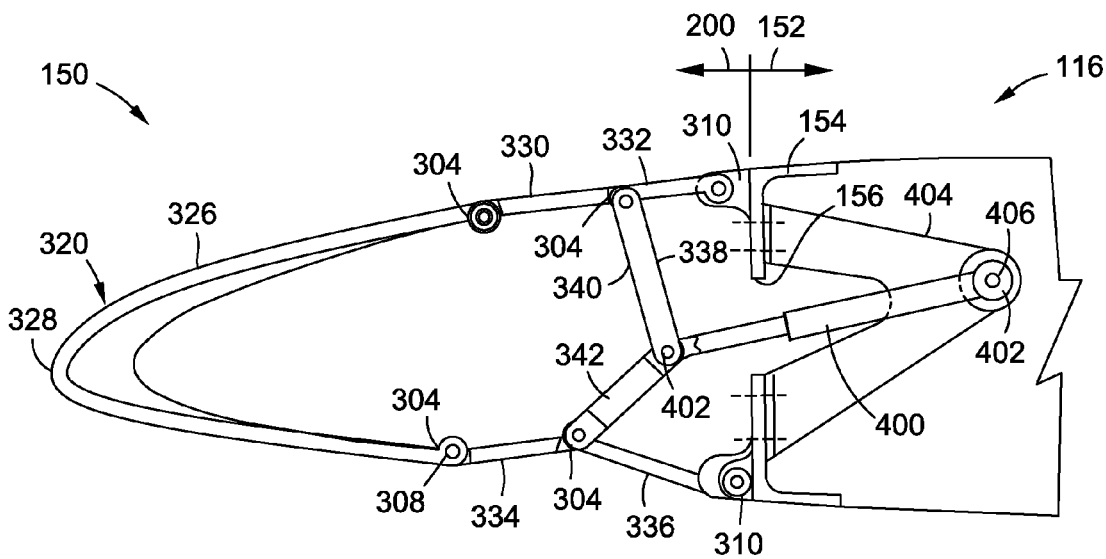
FIGS. 13-15 are sectional views of the first rib of FIG. 12 showing the progression in the transition of the first rib from the first extended shape to the first folded shape.
Figure 14:
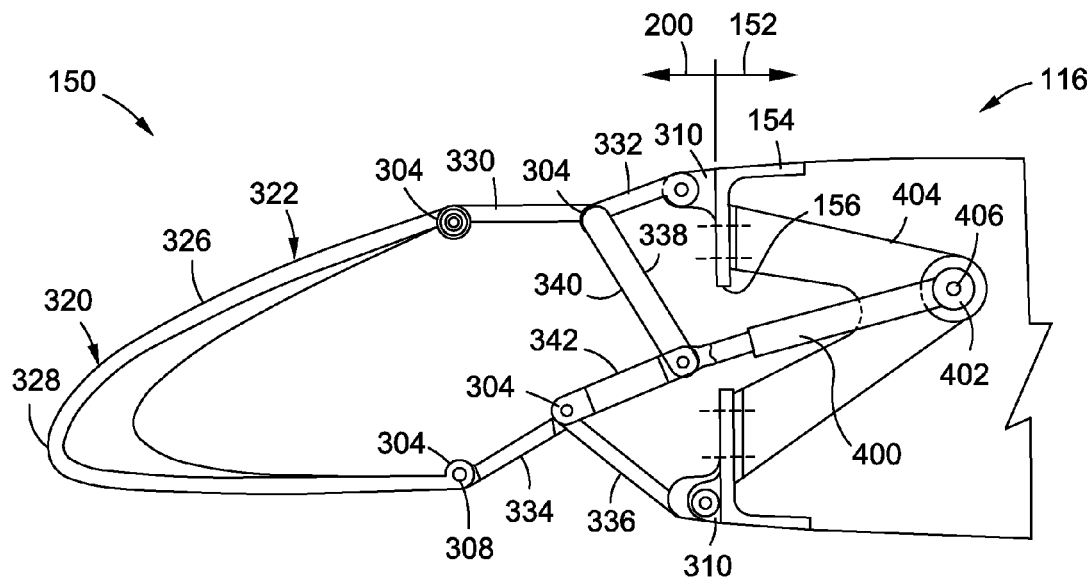
Figure 15:
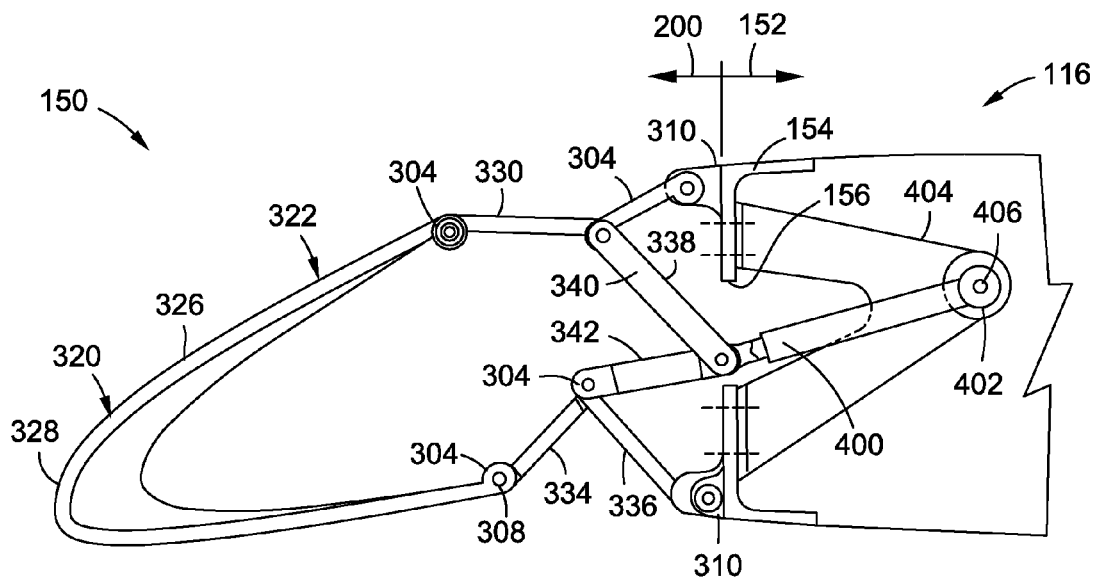

FIG. 13 shows the initial refraction of the first rib 320 toward the first folded shape 322. The actuator 400 may shorten in length which may result in drawing the first linkages 338 toward the front spar 154 and which may pull the upper and lower aft-most rib hinges 304 toward the rib chord line. FIG. 14 shows the actuator 400 further shortened in length and further retraction of the first rib 320 toward the first folded shape 322. FIG. 15 shows the first rib 320 in its fully-retracted position which is the first folded shape 322. As can be seen, the lower portion of the first rib 320 is shortened to a greater extent than the upper portion of the first rib 320 which results in drawing the leading edge 200 of the first rib 320 in downward and aft direction.

Figure 16:
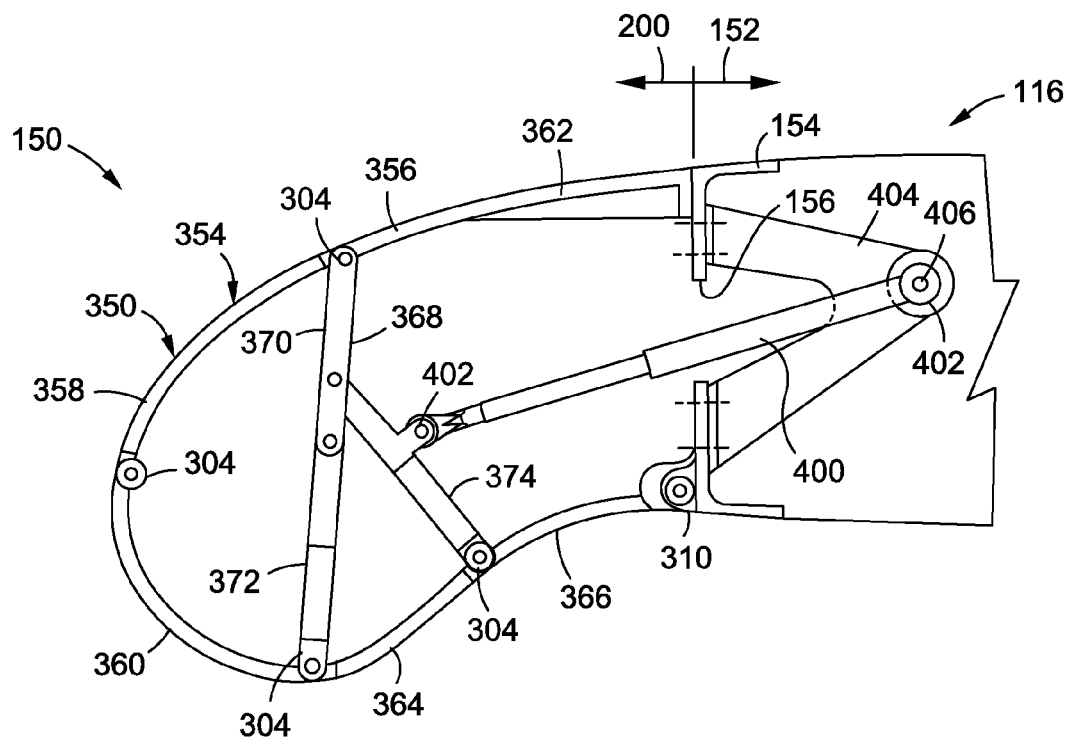
FIG. 16 is a sectional view of an example of a second rib in the second extended shape.

FIG. 16 shows the second rib 350 in the second extended shape 354. The second rib 350 may include five (5) rigid rib segments 362 which may be pivotably connected to one another using a rib hinge 304 between each pair of rib segments 362. However, the second rib 350 may be provided in an arrangement having more or less than second (5) rib segments. The second rib 350 may differ from the first rib 320 in that the second upper fixed segment 362 may be rigidly coupled to the wing box 152 such as the front spar 154 of the wing box 152. An opposite end of the second upper fixed segment 362 may be pivotably coupled to a second upper nose segment 358. The second upper nose segment 358 may be pivotably coupled to the second lower nose segment 360. The second rib 350 may further include a second lower forward segment 364 which may be pivotably coupled to a second lower aft segment 366. The second lower aft segment 366 may be pivotably coupled to the wing box 152 such as to a pair of segment attach tabs 310 that may extend from the front spar 154.

FIG. 16 further illustrates a linear actuator 400 anchored at one end to the front spar 154 by means of the actuator support bracket 404, and at an opposite end to the second linkages 368 for actuating the second rib segments 356 between the second extended and folded shape 354, 352. In FIG. 16, the actuator 400 is shown in a fully extended position which corresponds to the second extended shape 354 of the second rib 350. In the example shown, the second linkages 368 may include two forward-most links 370, 372 which may be pivotably coupled together at a location approximately midway between the opposing ends of the upper and lower forward-most links 370, 372. The upper forward-most link 370 may be pivotably coupled to the rib hinge 304 coupling the second upper fixed segment 362 to the second upper nose segment 358. The lower forward-most link 372 may be pivotably coupled to the rib hinge 304 coupling the second lower forward segment 364 to the second lower nose segment 360. When the second rib 350 is in the second extended shape 354, the upper and lower forward-most links 370, 372 may be aligned with one another.

The second linkages 368 may include an aft-most link 374. An upper end of the aft-most link 374 may be pivotably coupled to the upper forward-most link 370 at a location approximately one-third of the distance from the connection of the upper and lower forward-most links 370, 372. A lower end of the aft-most link 374 may be pivotably coupled to the rib hinge 304 coupling the second lower aft segment 366 to the second lower forward segment 364. The linear actuator 400 may be pivotably coupled to the aft-most link 374 at a location slightly above the midpoint along the length of the aft-most link 374. The second rib 350 may include or more of the rib hinges 304 incorporating the above-described rotation-limiting capability to limit the movement of the second rib segments 356 to a single path or direction which may render the motion of the second rib 350 determinant.

Figure 17:
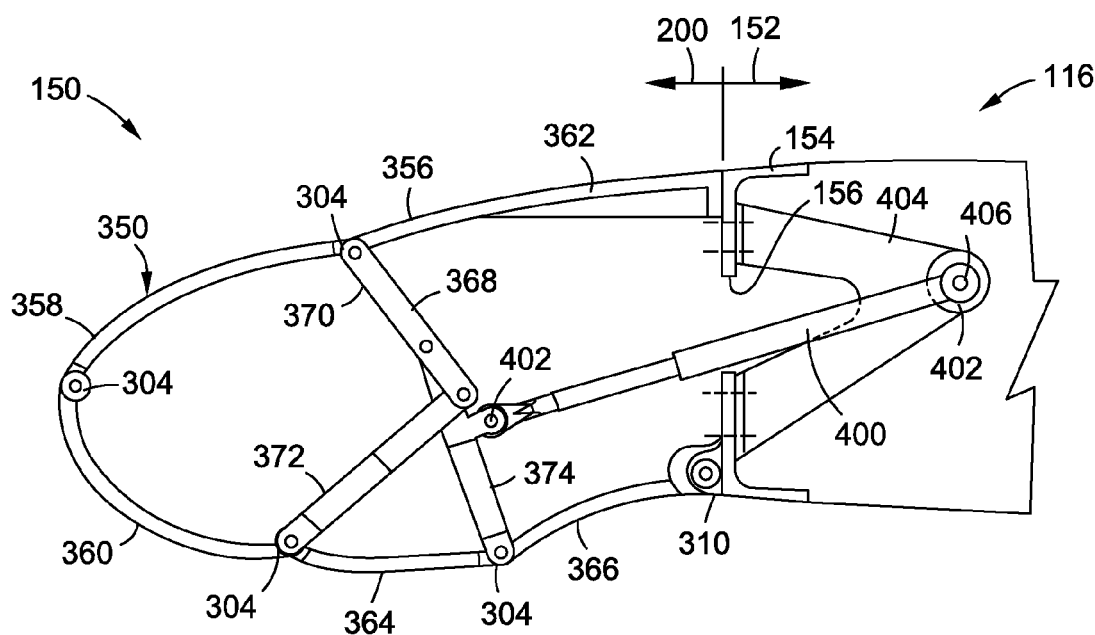
FIGS. 17-19 are sectional views of the second rib of FIG. 16 showing the progression in the transition of the second rib from the second extended shape to the second folded shape.

FIG. 17 shows the initial retraction of the second rib 350 toward the second folded shape 352. The linear actuator 400 may shorten in length by retracting the piston within the cylinder to draw the pivotable connections of the second linkages 368 in an aft direction. More specifically, retraction of the linear actuator 400 may pivot the upper and lower forward-most links 370, 372 into a horizontal V-shape which may draw the rib hinge 304 coupling the second lower nose segment 360 and the second lower forward segment 364 in a slightly forward direction. In addition, the second upper nose segment 358 may pivot upwardly about the rib hinge 304 connected to the second upper fixed segment 362.

Figure 18:
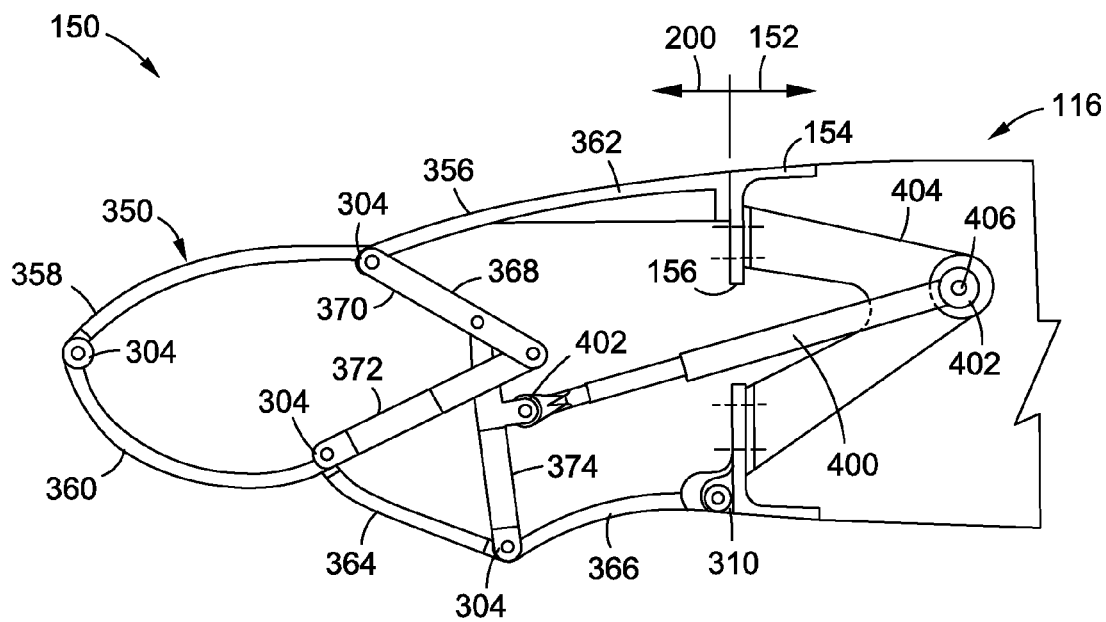
Figure 19:
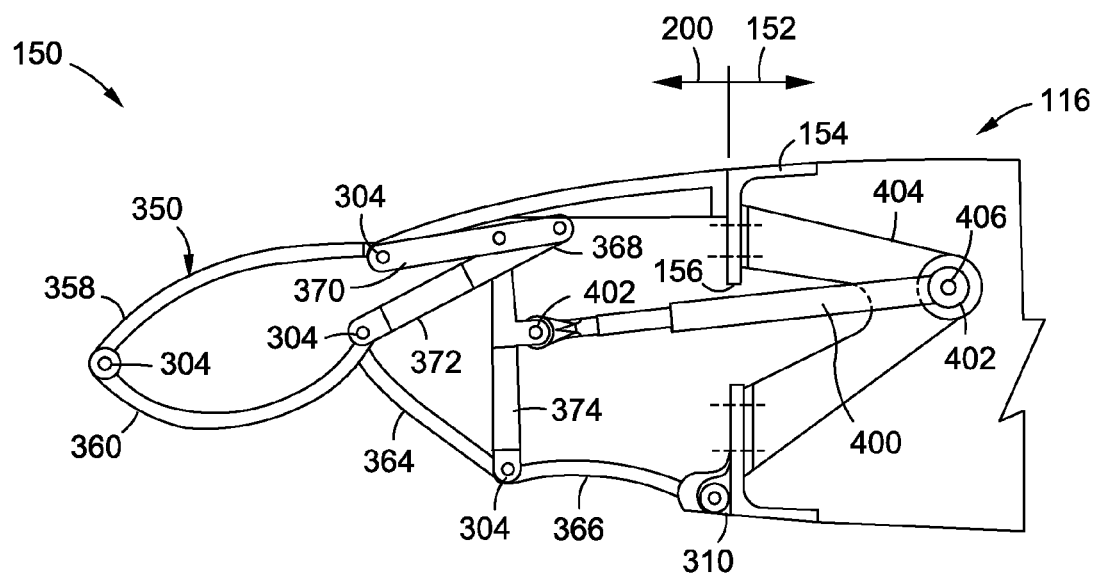

FIG. 18 shows further retraction of the second rib 350 and the further upward pivoting of the second upper nose segment 362. FIG. 19 shows the second rib 350 in its fully-retracted position which is the second folded shape 352. The actuator 400 is fully retracted and further motion of the second rib segments 356 may be limited by contact between the second linkages 368 and the second upper fixed segment 362.

FIG. 20 shows a wing 116 of an aircraft 100 having a plurality of first and second ribs 320, 350 and/or rib assemblies 302 located at spaced intervals along a spanwise direction 176 of the wing 116. The first and second ribs 320, 350 and/or rib assemblies 302 may be located at any spacing along the leading edge 200 of an airfoil 150. In some examples, an airfoil 150 such as an aircraft wing 116 may be provided with a single, continuous leading edge 200 extending along a substantial span of the wing 116. In other examples, multiple leading edge segments (not shown) may be provided along a span of a wing 116, and may be independently movable to vary the curvature profile of the leading edge skin 202 of each leading edge segment in order to vary the wing camber along a spanwise direction 176 of the wing 116, as mentioned above. Leading edge segments may also be provided on airfoils 150 other than wings such as on a horizontal or vertical stabilizer, or on other airfoils 150.

FIG. 21 shows a portion of an aircraft wing 116 illustrating spanwise stiffeners 178 that may optionally be included with the leading edge 200 to increase the spanwise bending stiffness of the leading edge skin 202. One or more spanwise stiffeners 178 may be extended between unsupported sections of the leading edge skin 202 such as between pairs of ribs 320, 350 or between pairs of rib assemblies 302. The spanwise stiffeners 178 may resist deflection of the leading edge skin 202 in the spanwise direction 176 under aerodynamic loads on the upper and/or lower surfaces of the leading edge 200.

FIG. 22 shows a section of an aircraft wing 116 and illustrating an embodiment of a leading edge 200 having spanwise stiffeners 178 mounted to the inner side of the leading edge skin 202. The spanwise stiffeners 178 may be separately formed and may be attached or mounted to the inner side of the leading edge skin 202 such as by mechanical fastening, adhesive bonding, or using other means. In some examples, the spanwise stiffeners 178 may be integrally formed with the leading edge skin 202. For example, one or more spanwise stiffeners 178 may be integrally machined into the inner side of a metallic leading edge skin 202. In other examples, the spanwise stiffeners 178 may be formed of composite material (e.g. graphite/epoxy) and may be co-bonded or co-cured with a composite laminate leading edge skin 202.

The spanwise stiffeners 178 may be provided in any one of a variety of different sizes, shapes, and geometries including, but not limited to, a blade section, an I-section, a hat section, or in other shapes. The spanwise stiffeners 178 may be configured such that the local bending stiffness of the leading edge skin 202 along the arc length direction is substantially unaffected by the manner in which the spanwise stiffeners 178 are coupled to the leading edge skin 202. The chordwise spacing of the spanwise stiffeners 178 may also be varied. For example, the spanwise stiffeners 178 may have a closer chordwise spacing at locations of the leading edge skin 202 that undergo relatively small changes in curvature during the transition of the leading edge skin 202 from the first curvature profile 210 to the second curvature profile 212. The spanwise stiffeners 178 may also be located at chordwise spacings that prevent the formation of facets or flat spots in the leading edge skin 202 in the first curvature profile 210 or in the second curvature profile 212. To avoid the occurrence of spanwise lumps or bumps in the leading edge skin 202 at the attachment locations of the spanwise stiffeners 178, the spanwise stiffeners 178 may be fastened and/or bonded to the leading edge skin 202 after the leading edge skin 202 has been preformed into a given curvature profile. For example, the leading edge skin 202 may be preformed into the first curvature profile 210 suitable for high-speed cruise flight, after which the spanwise stiffeners 178 may be attached to the leading edge skin 202.

Figure 23:
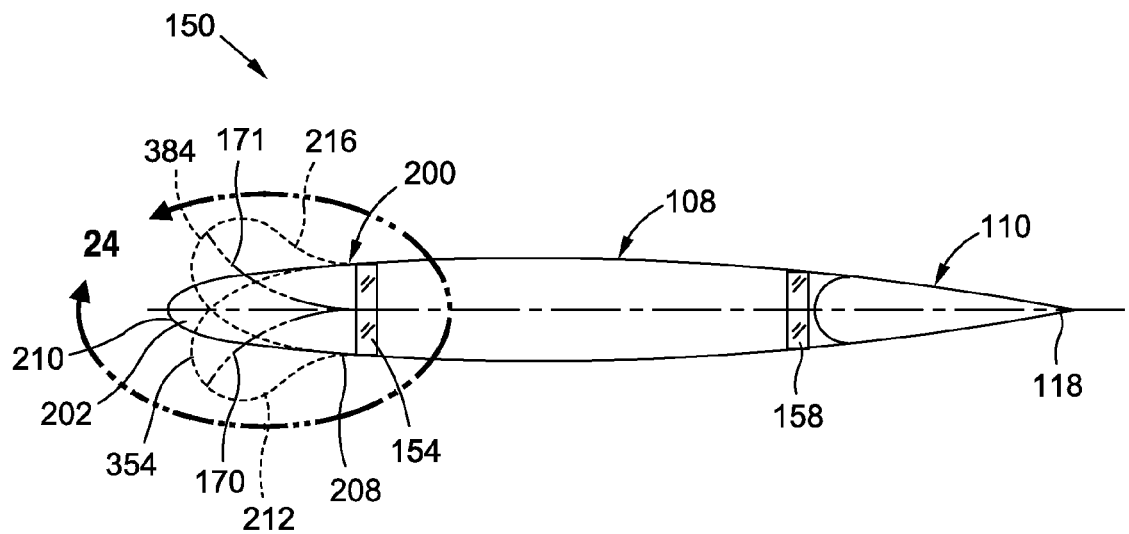
FIG. 23 is a sectional view of a symmetrical airfoil section having a neutral, first curvature profile (shown in solid lines) and changeable to a second curvature profile (shown in phantom lines) oriented in one direction, and a third curvature profile (shown in phantom lines) oriented in a direction opposite the second curvature profile.

FIG. 23 is a sectional view of an airfoil 150 section including one or more mechanisms 300 having first, second, and third ribs 320, 350, 380 for changing the curvature profile of the leading edge 200 from a first curvature profile 210 (shown in solid lines) to a second curvature profile 212 (shown in phantom lines), and from the first curvature profile 210 to a third curvature profile 216 (shown in phantom lines) oriented in a direction opposite the second curvature profile 212. The airfoil in FIG. 23 is shown as a symmetrical airfoil and the second and third curvature profiles 212, 216 are shown as mirror images of one another. The airfoil 150 may have a second camber 170 at the leading edge 200 when the leading edge skin 202 is in the second curvature profile 212, and a third camber 171 when the leading edge skin 202 is in the third curvature profile 216 which may be a mirror image of the second curvature profile 212. However, the mechanism 300 may be implemented on a non-symmetrical airfoil, as described below. Furthermore, the mechanism 300 may be configured to transition to a third curvature profile 216 that may be a non-mirror image of the second curvature profile 212, as described below.

Figure 24:
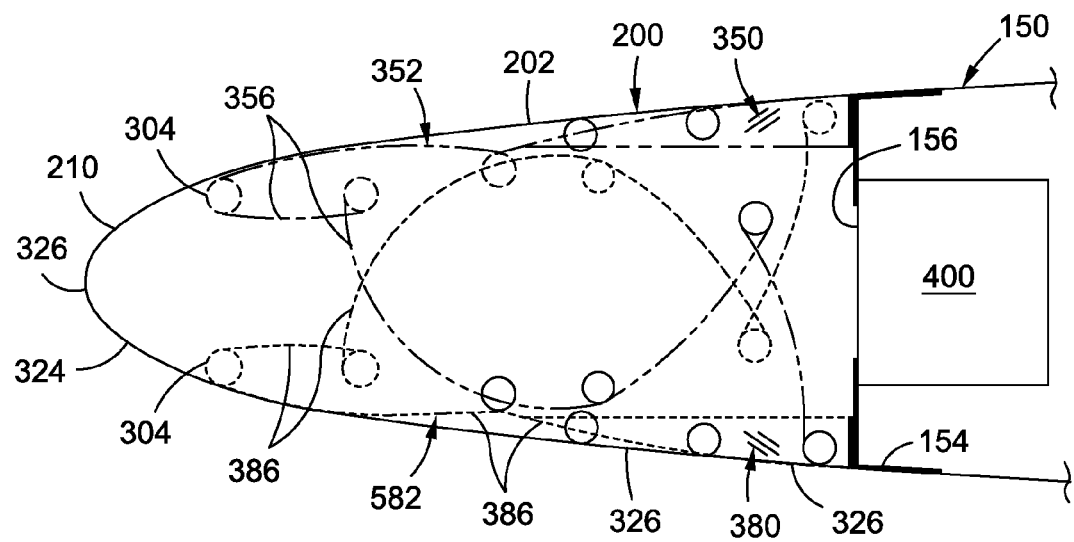
FIG. 24 is a sectional view of the leading edge taken along line 24 of FIG. 23 and showing an example of a mechanism having a first rib (in solid lines) in a first extended shape associated with the first curvature profile, and further showing a second rib (in phantom lines) in a second folded shape and a third rib (in dotted lines) in a third folded shape.

FIG. 24 is a schematic illustration of an example of a mechanism 300 implemented in a leading edge 200 of a symmetrical airfoil. The mechanism 300 may include a first rib 320 (in solid lines) shown in a first extended shape 324 associated with a symmetrical first curvature profile 210. The first rib segments 326 may be pivotably coupled together by a plurality of rib hinges 304, and may be transitioned between the first extended shape 324 and the first folded shape 322 by a plurality of first linkages (not shown) coupling the first rib segments 326 to one or more actuators 400, in a manner as described above. The mechanism 300 may include a second rib 350 (in phantom lines) shown in a second folded shape 352. The second rib segments 356 may also be pivotably coupled together by a plurality of rib hinges 304, and may be transitioned between the second extended shape 354 and the second folded shape 352 by a plurality of second linkages (not shown) coupling the second rib segments 356 to one or more actuators 400.

In FIG. 24, the mechanism 300 may additionally include a third rib 380 (in dotted lines) shown in a third folded shape 382. The third rib segments 386 may also be pivotably coupled together by a plurality of rib hinges 304, and may be transitioned between a third extended shape 384 and a third folded shape 352 by a plurality of third linkages (not shown) coupling the third rib segments 386 to one or more actuators 400 in a manner similar to the above-described process for actuating the first and second ribs 320, 350. One or more actuators 400 may be coupled to the first rib 320, the second rib 350, and/or the third rib 380, using first, second, and third linkages (not shown) to move the first rib 320, the second rib 350, and/or the third rib 380, between their respective folded and extended shapes. It should be noted that in any one of the examples disclosed herein, the first rib, the second rib, and the third rib may be provided with any number of respective rib segments and are not limited to the arrangement shown in the figures. Furthermore, in any one of the examples disclosed herein, the extended and folded shapes of the first rib, the second rib, and/or the third rib may be different than the shapes illustrated in the figures.

Figure 25:
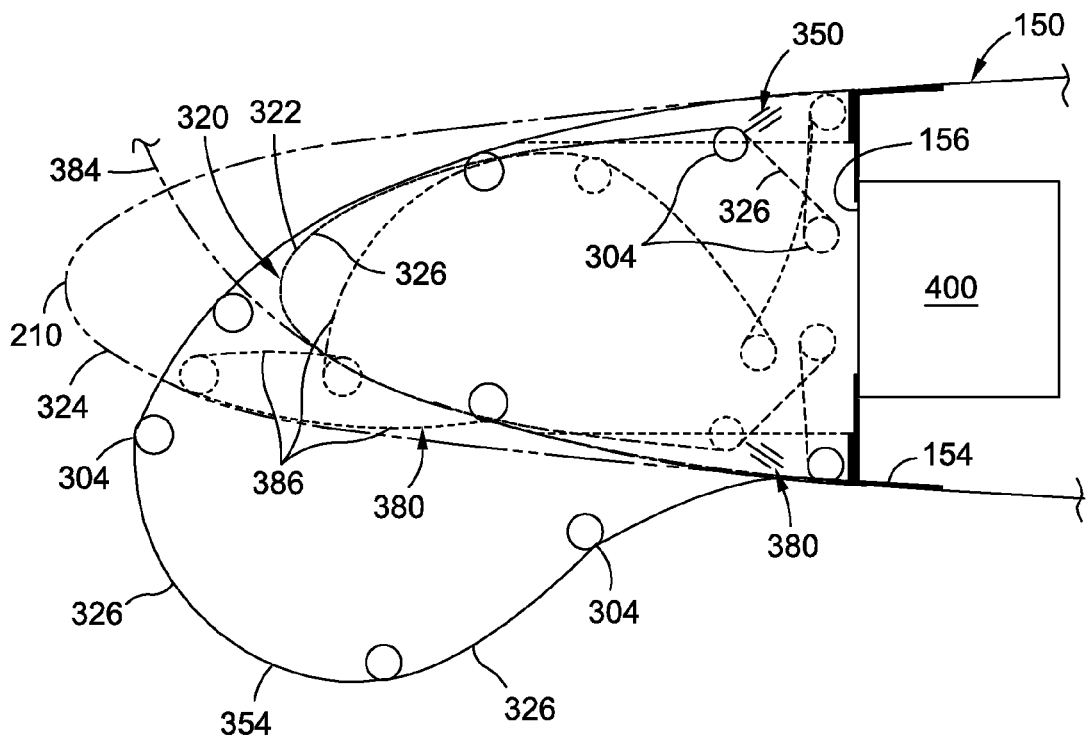
FIG. 25 is a sectional view of the leading edge of FIG. 24 showing the second rib (in solid lines) in a second extended shape associated with the second curvature profile, and further showing the first rib (in dashed lines) and the third rib (in dotted lines) in the respective first and third folded shape.

FIG. 25 is a sectional view of the leading edge 200 of FIG. 24 showing the second rib 350 in solid lines in a second extended shape 354 associated with the second curvature profile 212, and further showing the first rib 320 in dashed lines and the third rib 380 in dotted lines in the respective first and third folded shape 322, 382. The first rib 320 may be provided with first rib segments 326 that fit within an area defined by overlapping portions of the silhouettes of the second and third extended shape 354, 384 when the first rib 320 is in the first folded shape 322. The second rib 350 may be provided with second rib segments 356 that fit within the area defined by the overlapping portions of the silhouettes of the first and third extended shape 324, 384 when the second rib 350 is in the second folded shape 352.

Figure 26:
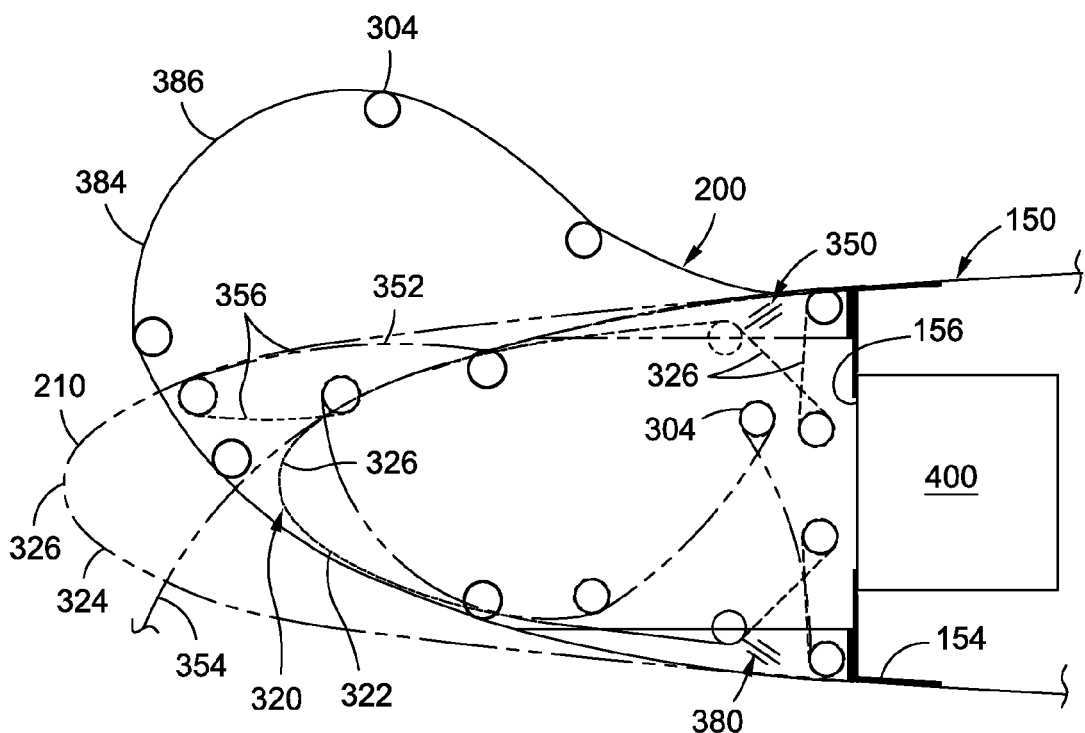
FIG. 26 is a sectional view of the leading edge of FIG. 24 showing the third rib (in solid lines) in the third extended shape associated with the third curvature profile, and further showing the first rib (in dashed lines) and the third rib (in phantom lines) in the respective first and third folded shape.

FIG. 26 is a schematic illustration of an example of the leading edge 200 of FIG. 24 showing the third rib 380 (in solid lines) in the third extended shape 384 associated with the third curvature profile 216. The third extended shape 384 may be oriented in a direction opposite the second extended shape 354. The first rib 320 is shown in dashed lines in the first folded shape 322, and the third rib 380 is shown in phantom lines in the third folded shape 382. The third rib 380 may be provided with third rib segments 386 that fit within the area defined by the overlapping portions of the silhouettes of the first and second extended shape 324, 354 when the third rib 380 is in the third folded shape 382.

As indicated above, a mechanism 300 capable of changing the camber in either direction may be implemented in any one of a variety of different types of airfoils 150. In one example, one or more of the mechanisms 300 may be implemented in a vertical stabilizer 108 (FIG. 2) to provide improved aerodynamic performance in both directions (e.g., the left side and the right side) of the vertical stabilizer 108. In this regard, the mechanism 300 may be configured to change the curvature profile of the leading edge 200 of the vertical stabilizer 108 from a symmetrical low-drag profile (see e.g., the first curvature profile 210 in FIG. 24) to a high-lift profile (see e.g., the second curvature profile 212 in FIG. 25, or the third curvature profile 216 in FIG. 26) that may provide increased lift in either the left direction or the right direction, depending upon the direction in which the camber is increased. Such an implementation may include three (3) types of ribs each having rib segments pivotably coupled to one another and actuated between extended and folded shapes. For example, as indicated above, implementation of a mechanism 300 on a vertical stabilizer 108 may include one or more first ribs 320 configured to support the leading edge skin 202 of the vertical stabilizer 108 in a first curvature profile 210 (see e.g., FIG. 24) which may be a symmetrical low-drag profile. One or more second ribs 350 may be provided to support the leading edge skin 202 in a second curvature profile 212 having a second camber 170 (see e.g., FIG. 25), and one or more third ribs 380 may be provided to support the leading edge skin 202 of the vertical stabilizer 108 in a third curvature profile 216 having a third camber 171 (see e.g., FIG. 26) in a direction opposite the second camber 170.

Implementation of the mechanism 300 in a vertical stabilizer 108 may allow for a reduction in the size of the vertical tail which is typically sized based upon the magnitude of the side-force-generating capability of the vertical tail to counter a moment generated by asymmetric thrust in the event of an engine failure on one side of the aircraft 100. The ability to transition the leading edge 200 of the vertical stabilizer 108 from a symmetrical low-drag profile to a high-lift profile toward either side of the aircraft 100 may improve the side-force-generating capability of the vertical tail and may thereby allow for a reduction in the overall mass and size of the vertical tail with a corresponding reduction in aerodynamic drag.

Implementation of a mechanism 300 having first, second, and third ribs 320, 350, 380 and capable of changing the camber of an airfoil 150 in either direction (e.g., left or right, up or down, etc.) is not limited to a vertical stabilizer 108, and may be applied to any airfoil 150, without limitation. For example, a mechanism 300 capable of changing the camber of an airfoil 150 in either direction may be implemented on a wing 116 as a means to vary the wing camber along a spanwise direction 176. In this regard, a plurality of mechanisms (not shown) may be implemented at spaced intervals along a leading edge 200 of a wing 116 to differentially adjust the leading edge 200 upwardly or downwardly at relatively small deflection angles along the wing span as a means to adjust the wing camber along a spanwise direction 176 during different phases of flight. Wing camber may be adjusted along a spanwise direction 176 as a means to reduce aerodynamic drag of the wings 116 such as during cruise flight, and/or to optimize the span load distribution of the wings 116 to reduce the wing bending moment at the wing root and thereby allow for a reduction in the structural mass of the aircraft 100.

Figure 27:
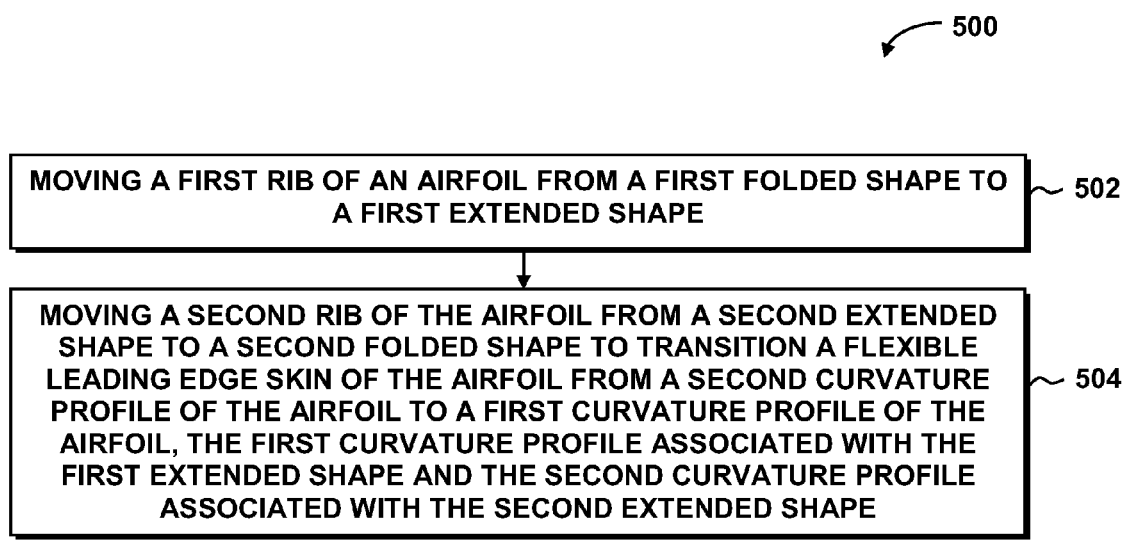
FIG. 27 is a flowchart having one or more operations that may be included in a method of changing a camber of an airfoil.

FIG. 27 shows a flowchart having one or more operations that may be included in a method 500 of changing the camber of an airfoil 150. The method 500 may include Step 502 including moving a first rib 320 of an airfoil 150 from a first folded shape 322 to a first extended shape 324. For example, one more actuators 400 may be coupled to the first rib 320, the second rib 350, or both, and may be operative to move the first rib 320, the second rib 350, or both, between their respective folded and extended shapes 322, 324, 352, 354. As indicated above, one or more of the actuators 400 may be respectively coupled to one or more of the first and second rib segments 326, 356 using one or more first and second linkages 368.

Step 504 of the method 500 may include moving the second rib 350 of the airfoil 150 from a second extended shape 354 to a second folded shape 352 to transition a flexible leading edge skin 202 of the airfoil 150 from a second curvature profile 212 of the airfoil 150 to a first curvature profile 210 of the airfoil 150. As noted above, the first curvature profile 210 of the airfoil 150 may be associated with the first extended shape 324 and the second curvature profile 212 of the airfoil 150 may be associated with the second extended shape 354. The step of moving the second rib 350 into the second extended shape 354 may occur while the first rib 320 is moved into the first folded shape 322. Likewise, the first rib 320 may be moved into the first extended shape 324 while the second rib 350 is moved into the second folded shape 352 to transition the leading edge skin 202 from the first curvature profile 210 to the second curvature profile 212.

The method may further include maintaining a tangency of the outer surface 208 of the flexible leading edge skin 202 to the outer surface 172 of a wing box 152 of the airfoil 150 on both sides of the airfoil 150 when transitioning the flexible leading edge skin 202 from the second curvature profile 212 to the first curvature profile 210, and vice versa. For example, FIGS. 4-8 illustrate the leading edge skin 202 maintained in tangency to the outer surfaces 172 of the upper and lower sides of the wing box 152 during the transition of the leading edge skin 202 from the first curvature profile 210 (FIG. 4) to the second curvature profile 212 (FIG. 8). By maintaining the leading edge skin 202 in tangency with the wing box 152, and by avoiding steps, gaps, and/or abrupt changes or kinks in the curvature in the outer surfaces of both sides of the airfoil 150, non-laminar flow over the airfoil 150 may be avoided. By maintaining laminar flow over both sides (e.g., the upper and lower side) of the airfoil 150, the aerodynamic performance of the airfoil 150 may be improved and airframe noise may be reduced.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A mechanism for changing a shape of a flexible leading edge of an airfoil, comprising:
a first rib including a plurality of first rib segments, the first rib configured to move between a first folded shape and a first extended shape;
a second rib including a plurality of second rib segments, the second rib configured to move between a second folded shape and a second extended shape; and
one or more actuators coupled to the first rib, the second rib, or both, to move the first rib, the second rib, or both, between their respective folded and extended shapes wherein the one or more actuators are coupled to the first rib and the second rib and the one or more actuators are configured to move the second rib into the second extended shape while moving the first rib into the first folded shape.

2. The mechanism of claim 1, wherein:
the first rib segments fit within the second extended shape when the first rib is in the first folded shape; and
the second rib segments fit within the first extended shape when the second rib is in the second folded shape.

3. The mechanism of claim 1, further including:
a plurality of first and second linkages coupling the actuator to the first and second ribs, respectively; and
wherein the first and second linkages fit within a second and first extended shape, respectively, when the first and second ribs are in their respective first and second folded shape.

4. The mechanism of claim 1, wherein:
the first and second ribs are configured to remain in a vertical plane during a transition between the first folded and extended shapes and the second folded and extended shapes, respectively.

5. The mechanism of claim 1, wherein:
the plurality of first rib segments include a first nose segment, a first upper forward segment pivotably coupled to the first nose segment, a first upper aft segment pivotably coupled to the first upper forward segment, a first lower forward segment pivotably coupled to the first nose segment, and a first lower aft segment pivotably coupled to the first lower forward segment; and
the plurality of second rib segments include a second upper nose segment, a second lower nose segment pivotably coupled to the second upper nose segment, a second upper fixed segment pivotably coupled to the second upper nose segment, a second lower forward segment pivotably coupled to the second lower nose segment, and a second lower aft segment pivotably coupled to the second lower forward segment.

6. The mechanism of claim 1, wherein:
the first extended shape corresponds to a first curvature profile of a leading edge of an airfoil suitable for cruise flight; and
the second extended shape corresponds to a second curvature profile of the leading edge of the airfoil suitable for low-speed flight.

7. The mechanism of claim 1, further comprising:
a third rib including a plurality of third rib segments, the third rib configured to move between a third folded shape and a third extended shape, the third extended shape oriented in a direction opposite the second extended shape; and
the actuator coupled to the first rib, the second rib, and/or the third rib, to move the first rib, the second rib, and/or the third rib, between their respective folded and extended shapes.

8. An airfoil, comprising:
a leading edge including a flexible leading edge skin having a first end, a second end, and an arc length defined therebetween;
a first rib including a plurality of first rib segments, the first rib configured to move between a first folded shape and a first extended shape;
a second rib including a plurality of second rib segments, the second rib configured to move between a second folded shape and a second extended shape; and
the first and second rib segments operable to transition the flexible leading edge skin from a first curvature profile associated with the first extended shape to a second curvature profile associated with the second extended shape without a change in the arc length wherein said airfoil further comprises one or more actuators coupled to the wing box and configured to move the second rib into the second folded shape while moving the first rib into the first extended shape.

9. The airfoil of claim 8, wherein:
the flexible leading edge skin has a skin thickness which varies along a chordwise direction and/or spanwise direction of the airfoil.

10. The airfoil of claim 8, further including:
a wing box aft of the leading edge; and
wherein the plurality of first rib segments includes a first upper aft segment and a first lower aft segment pivotably attached to the wing box, and the plurality of second rib segments includes a second upper fixed segment fixedly attached to the wing box and a second lower aft segment pivotably attached to the wing box.

11. The airfoil of claim 10, wherein:
an outer surface of the flexible leading edge skin is tangent to an outer surface of the airfoil at the wing box on both sides of the airfoil when the flexible leading edge skin is in the first curvature profile and in the second curvature profile.

12. The airfoil of claim 10, wherein:
an outer surface of the flexible leading edge skin is continuous from a first side of the wing box to a second side of the wing box.

13. The airfoil of claim 8, wherein:
the second rib is one of a pair of second ribs, the first rib positioned between the pair of second ribs to form a rib assembly, the airfoil further comprising a plurality of rib assemblies along a spanwise direction of the airfoil.

14. A method of changing a camber of an airfoil, comprising:
moving a first rib of an airfoil from a first folded shape to a first extended shape, the first rib comprising a plurality of first rib segments pivotably coupled to one another; and
moving a second rib of the airfoil from a second extended shape to a second folded shape, the second rib comprising a plurality of second rib segments pivotably coupled to one another, to transition a flexible leading edge skin of the airfoil from a second curvature profile of the airfoil to a first curvature profile of the airfoil, the first curvature profile associated with the first extended shape and the second curvature profile associated with the second extended shape
wherein the step of moving the second rib into the second folded shape occurs while moving the first rib into the first extended shape.

15. The method of claim 14, further including:
moving the first rib from the first extended shape to the first folded shape while moving the second rib from the second folded shape to the second extended shape to transition the flexible leading edge skin of the airfoil from the first curvature profile to the second curvature profile, the first curvature profile corresponding to a shape of the leading edge suitable for cruise flight and the second curvature profile corresponding to a shape of the leading edge suitable for low-speed flight.

16. The method of claim 14, further including:
maintaining a tangency of an outer surface of the flexible leading edge skin to an outer surface of a wing box of the airfoil on both sides of the airfoil when transitioning the flexible leading edge skin from the first curvature profile to the second curvature profile.

17. The method of claim 14, further including:
controlling an actuator coupled to the first rib, the second rib, or both, to move the first rib, the second rib, or both, between their respective folded and extended shapes.

18. The method of claim 14, further including:
actuating the first and second rib segments using first and second linkages coupling the actuator to the first and second ribs, respectively.

* * * * *